United States Patent
Baek et al.

(10) Patent No.: US 10,448,486 B2
(45) Date of Patent: Oct. 15, 2019

(54) APPARATUS AND METHOD FOR CONTROLLING LIGHTING DEVICE IN ELECTRONIC DEVICE

(71) Applicant: Samsung Electronics Co., Ltd., Suwon-si, Gyeonggi-do (KR)

(72) Inventors: Du-San Baek, Seoul (KR); Kwan-Woo Song, Yongin-si (KR); Gye-Young Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 715 days.

(21) Appl. No.: 14/740,687

(22) Filed: Jun. 16, 2015

(65) Prior Publication Data

US 2015/0366035 A1    Dec. 17, 2015

(30) Foreign Application Priority Data

Jun. 16, 2014 (KR) .................. 10-2014-0072891
Jun. 12, 2015 (KR) .................. 10-2015-0083447

(51) Int. Cl.
*H05B 37/02* (2006.01)

(52) U.S. Cl.
CPC ..... *H05B 37/0272* (2013.01); *H05B 37/0209* (2013.01); *Y02B 20/48* (2013.01)

(58) Field of Classification Search
CPC .................. H05B 37/0272; H05B 37/0209
See application file for complete search history.

(56) References Cited

U.S. PATENT DOCUMENTS

| | | | |
|---|---|---|---|
| 8,554,086 B2 | 10/2013 | Ann | |
| 2002/0154025 A1 | 10/2002 | Ling | |
| 2008/0157957 A1 | 7/2008 | Pitchers et al. | |
| 2008/0166135 A1 | 7/2008 | Ann | |
| 2008/0218334 A1 | 9/2008 | Pitchers et al. | |
| 2011/0199004 A1* | 8/2011 | Henig | H05B 37/0218 315/152 |
| 2011/0234366 A1* | 9/2011 | Feng | G08C 17/02 340/3.1 |
| 2012/0320262 A1* | 12/2012 | Chung | H05B 37/0272 348/370 |
| 2014/0015415 A1* | 1/2014 | Lim | H05B 37/02 315/131 |
| 2014/0062309 A1* | 3/2014 | Kim | H05B 37/0227 315/132 |

(Continued)

FOREIGN PATENT DOCUMENTS

WO     2006/095315 A1    9/2006

*Primary Examiner* — Stephen T. Reed
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method for operating an electronic device is provided. The method includes measuring a Received Signal Strength Indicator (RSSI) of a plurality of signals received from a plurality of lighting devices, and displaying the plurality of lighting devices according to the RSSI of the plurality of signals.

6 Claims, 27 Drawing Sheets

(56) References Cited

U.S. PATENT DOCUMENTS

| | | | |
|---|---|---|---|
| 2014/0070706 A1* | 3/2014 | Fushimi | H05B 33/0863 315/131 |
| 2014/0246991 A1 | 9/2014 | Kim | |
| 2015/0015145 A1* | 1/2015 | Carrigan | H05B 37/0272 315/131 |

* cited by examiner

APPARATUS AND METHOD FOR CONTROLLING LIGHTING DEVICE IN ELECTRONIC DEVICE

CROSS-REFERENCE TO RELATED APPLICATION(S)

This application claims the benefit under 35 U.S.C. § 119(a) of a Korean patent application filed on Jun. 16, 2014 in the Korean Intellectual Property Office and assigned Serial number 10-2014-0072891, and a Korean patent application filed on Jun. 12, 2015 in the Korean Intellectual Property Office and assigned Serial number 10-2015-0083447, the entire disclosure of each of which is hereby incorporated by reference.

TECHNICAL FIELD

The present disclosure relates to wireless communication. More particularly, the present disclosure relates to controlling lighting devices in an electronic device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Due to advancements in communication technologies, the communication technologies are applied to wider areas. It is possible to remotely control devices which were not controlled using a communication according to the related art. For example, a lighting device has communication functionality so that a user can control the lighting device, for example, turn on/off the lighting device and control a brightness or a color of the lighting device through a control device.

A plurality of lighting devices can be remotely controlled in a space. To control a particular one of the lighting devices, the user can identify the particular lighting device by activating or deactivating the controllable lighting devices in sequence. To group a plurality of lighting devices, the user creates a group based on a name or identification (ID) of the lighting devices. In this case, an unintended lighting device can be added to the group or the lighting device can be added after the controlling.

Therefore, a need exists for an apparatus and a method for intuitively processing identification of a lighting device in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for intuitively processing identification of a lighting device in an electronic device.

Another aspect of the present disclosure is to provide an apparatus and a method for automatically recommending and setting a group with a plurality of lighting devices in an electronic device.

Another aspect of the present disclosure is to provide an apparatus and a method for controlling a lighting device using a received signal strength indicator (RSSI) in an electronic device.

Another aspect of the present disclosure is to provide an apparatus and a method for grouping lighting devices using an RSSI in an electronic device.

Another aspect of the present disclosure is to provide an apparatus and a method for providing an RSSI measured by a lighting device to a control device in an electronic device.

In accordance with an aspect of the present disclosure, an electronic device is provided. The electronic device includes a control unit configured to measure a RSSI of a plurality of signals received from a plurality of lighting devices, and a display unit configured to display the plurality of lighting devices according to the RSSI of the plurality of signals.

In accordance with another aspect of the present disclosure, a lighting device is provided. The lighting device includes a control unit configured to measure an RSSI of a signal received from an electronic device, and an output unit configured to output a light according to the RSSI.

In accordance with another aspect of the present disclosure, a method for operating an electronic device is provided. The method includes measuring an RSSI of a plurality of signals received from a plurality of lighting devices, and displaying the plurality of lighting devices according to the RSSI of the plurality of signals.

In accordance with another aspect of the present disclosure, a method for operating a lighting device is provided. The method includes measuring an RSSI of a signal received from an electronic device, and outputting a light according to the RSSI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for identifying and setting a lighting device using a received signal strength indicator (RSSI) in an electronic device.

Figure 1:
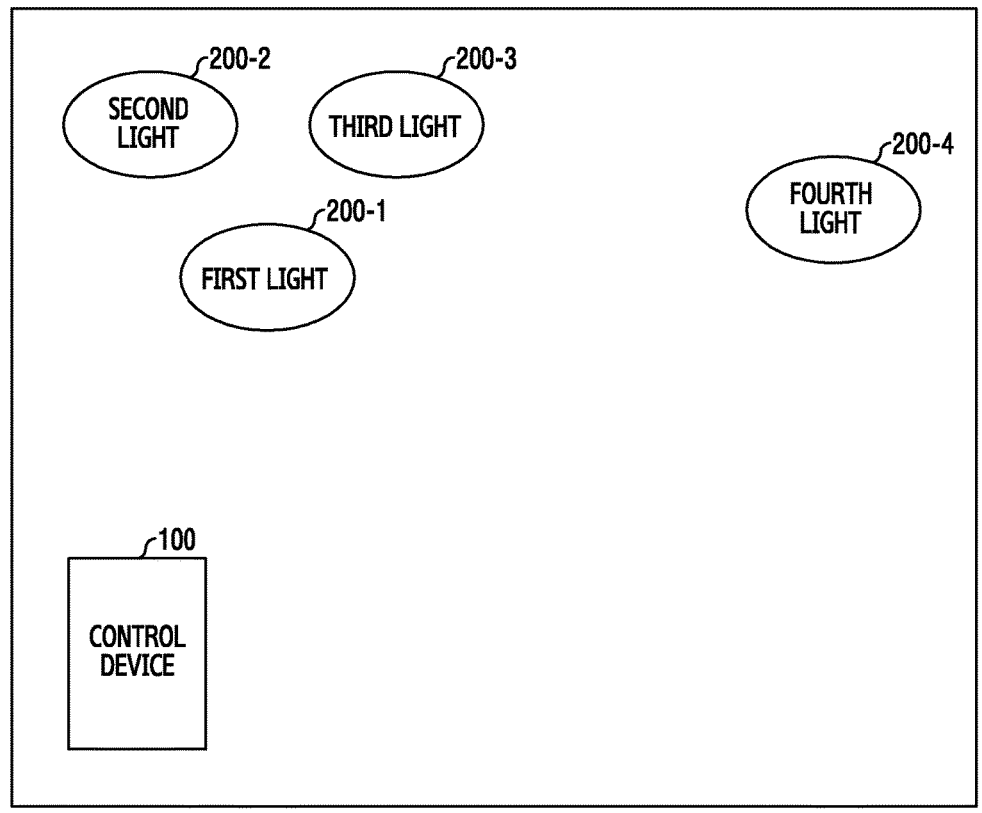
FIG. 1 illustrates a communication environment of a control device and a lighting device according to an embodiment of the present disclosure.

FIG. 1 illustrates a communication environment of a control device and a lighting device according to an embodiment of the present disclosure.

Referring to FIG. 1, a user can control lighting devices 200-1 through 200-4 through a control device 100.

The control device 100 is an electronic device capable of communicating with the lighting devices 200-1 through 200-4. The control device 100 can include a communication unit for communicating with the lighting devices 200-1 through 200-4. For example, the control device 100 can include one of a smart phone, a portable terminal, a mobile phone, a mobile pad, a media player, a tablet computer, a handheld computer, a personal digital assistant (PDA), a wireless controller, and a wearable device, and combine functions of two or more of these devices. The control device 100 can be referred to as an electronic device.

The lighting devices 200-1 through 200-4 are devices capable of outputting a light and communicating with the lighting devices 200-1 through 200-4 and the control device 100. For example, the first lighting device 200-1 can communicate at least one of the second lighting device 200-2, the third lighting device 200-3, the fourth lighting device 200-4, and the control device 100. For example, the first lighting device 200-1 can transmit and receive RSSI signals to and from at least one of the second lighting device 200-2, the third lighting device 200-3, the fourth lighting device 200-4, and the control device 100.

The communication between the control device 100 and the lighting devices 200-1 through 200-4 can be established based on at least one of Bluetooth (BT), BT Low Energy (BLE), Near Field Communication (NFC), Wi-Fi, Wireless Gigabit (WiGig), Zigbee, Ultra Wide Band (UWB), Infrared Data Association (IrDA), Visible Light Communication (VLC), Global System for Mobile Communication (GSM), Enhanced Data GSM Environment (EDGE), Code Division Multiple Access (CDMA), and Long Term Evolution (LTE).

Figure 2:
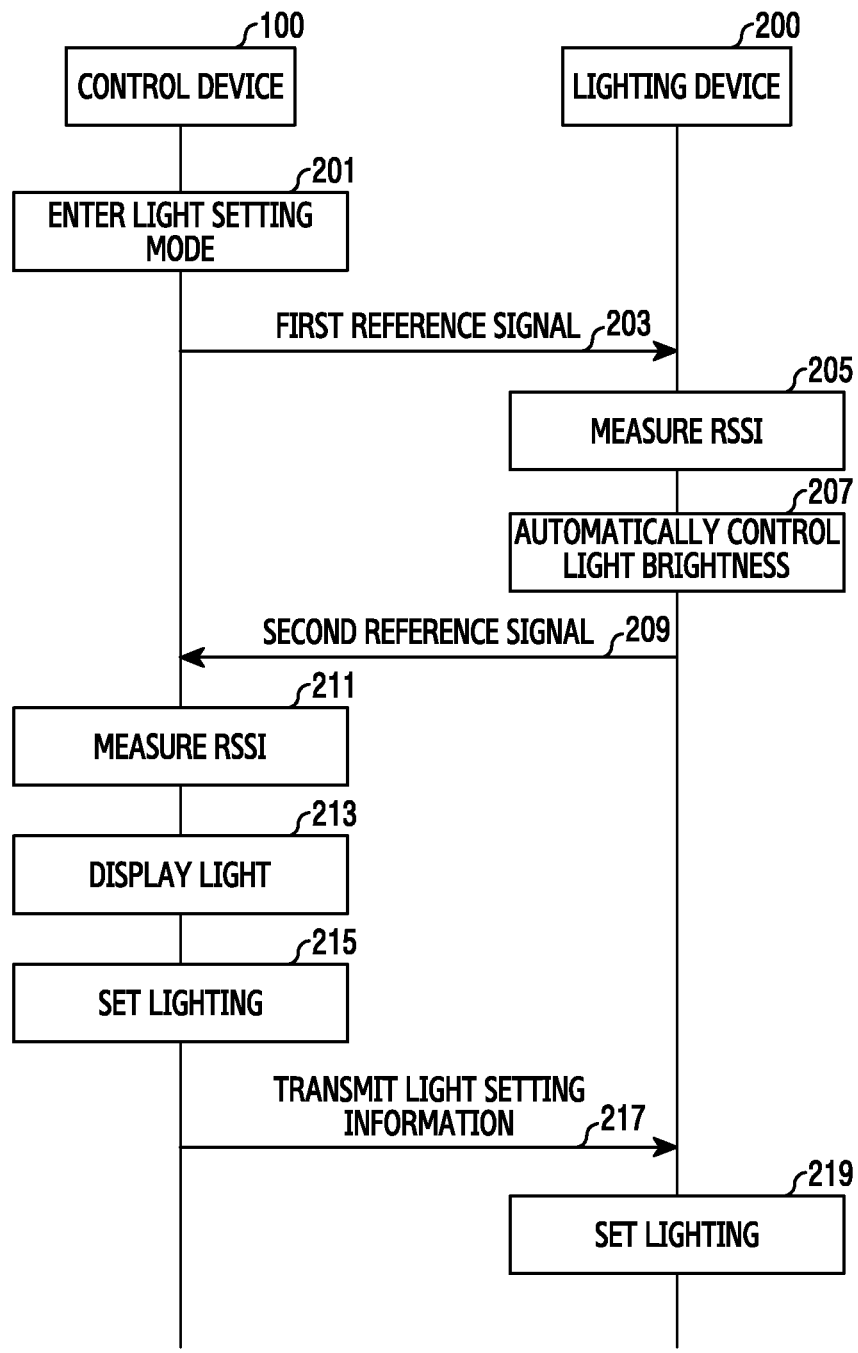
FIG. 2 is a signal flow diagram between a control device and a lighting device according to an embodiment of the present disclosure.

FIG. 2 is a signal flow diagram between a control device and a lighting device according to an embodiment of the present disclosure.

Referring to FIG. 2, the control device 100 enters a light setting mode in operation 201. The light setting mode indicates an interface for the control device 100 to control at least one lighting device. For example, to enter the light setting mode, the control device 100 can execute a user interface which supports the light setting mode.

In operation 203, the control device 100 transmits a first reference signal to at least one lighting device 200. The first reference signal indicates a signal notifying the light setting mode entry of the control device 100. For example, the control device 100 transmits the first reference signal to the lighting device 200.

The lighting device 200 receives the first reference signal from the control device 100. The lighting device 200 can confirm the light setting mode entry of the control device 100 based on the first reference signal.

In doing so, the lighting device 200 can receive an arbitrary signal from the control device 100 at a preset cycle. The arbitrary signal indicates a signal for the lighting device 100 to measure the RSSI from the control device 100. For example, the control device 100 can transmit the arbitrary signal to the lighting device 200 at the preset cycles so that the lighting device 200 can measure the RSSI from the control signal 100.

In operation 205, the lighting device 200 measures the RSSI of the arbitrary signal. The lighting device 200 automatically controls the light brightness of the lighting device 200 based on the RSSI in operation 207. The lighting device 200 can automatically control the light brightness according to the RSSI and a preset RSSI threshold. The RSSI measured by the lighting device 200 can vary according to movement of the control device 100. For example, the RSSI measured by the lighting device 200 can vary according to a distance change between the control device 100 and the lighting device 200. Hence, the lighting device 200 can control to increase or decrease the light brightness according to a preset criterion based on the movement of the control device 100.

According to an embodiment of the present disclosure, the first reference signal can include a message requesting information of the lighting device 200. According to an embodiment of the present disclosure, the first reference signal may not include the message requesting the information of the lighting device 200. For example, before transmitting the first reference signal to the lighting device 200, the control device 100 can transmit the message requesting the information of the lighting device 200. Alternatively, after transmitting the first reference signal to the lighting device 200, the control device 100 can transmit the message requesting the information of the lighting device 200. For example, the time for the control device 100 to transmit the message requesting the information of the lighting device 200 can differ.

In operation 209, the lighting device 200 transmits a second reference signal to the lighting device 100. The second reference signal indicates a signal including the information of the lighting device 200. For example, the second reference signal can include at least one of the model name, the output color, the color temperature, and the watts of the lighting device 200.

In doing so, the control device 100 can receive an arbitrary signal from the lighting device 200 at a preset cycle. The arbitrary signal indicates a signal for the control device 100 to measure the RSSI from the lighting device 200. For example, the lighting device 200 can transmit the arbitrary signal to the control device 100 at the preset cycles so that the control device 100 can measure the RSSI from the lighting device 200.

In operation 211, the control device 100 can measure the RSSI based on the arbitrary signal received from the lighting device 200. In operation 213, the control device 100 can display a light setting User Interface (UI) on the screen display unit of the control device 100 based on the RSSI. The light setting UI indicates a UI for controlling the lighting device 200. For example, the light setting UI can be displayed as an icon.

In operation 215, the control device 100 can generate light setting information of the lighting device 200 according to a user's input signal through the light setting UI. In operation 217, the control device 100 transmits the light setting information to the lighting device 200. In operation 219, the lighting device 200 sets the lighting of the lighting device 200 based on the light setting information.

Figure 3:
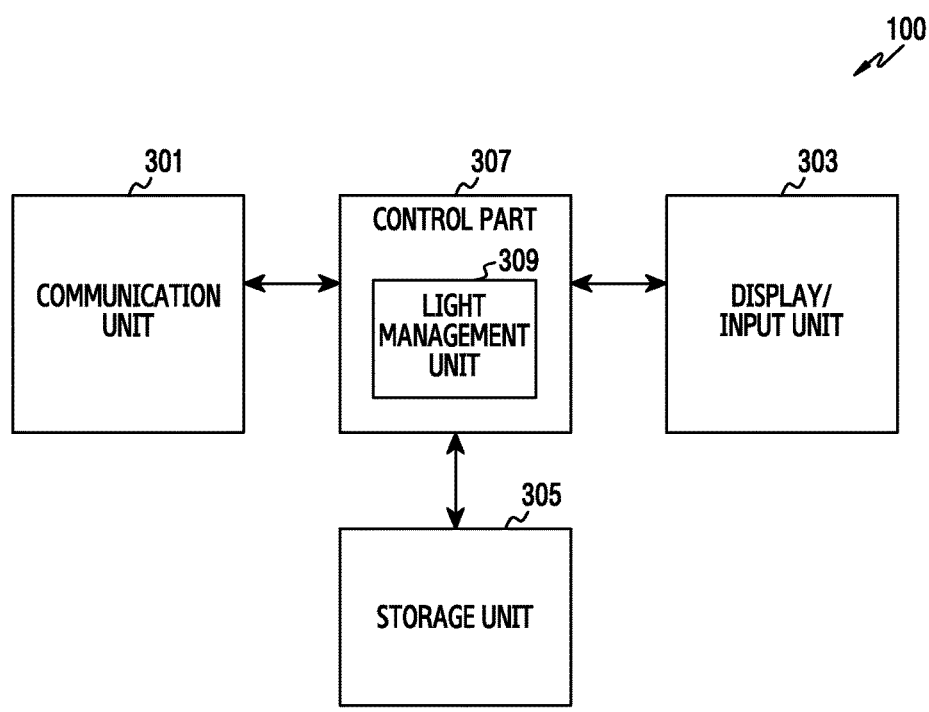
FIG. 3 is a block diagram of an electronic device according to an embodiment of the present disclosure.

FIG. 3 is a block diagram of an electronic device according to an embodiment of the present disclosure.

Referring to FIG. 3, the control device 100 includes a communication unit 301, a display/input unit 303, a storage unit 305, a control unit 307, and a light management unit 309.

The communication unit 301 processes to transmit and receive radio signals of data input and output via an antenna. For example, in the transmission, the communication unit 301 channel-encodes, Radio Frequency (RF)-processes, and transmits data to transmit. In the reception, the communication unit 301 converts a received RF signal to a baseband signal and restores data by channel-decoding the baseband signal. In addition to those typical functions, the communication unit 301 can transmit the message requesting to transmit at least one of the device information and the RSSI information of the lighting device to the plurality of lighting devices. The communication unit 301 can receive at least one of the device information and the RSSI information of the lighting device from the plurality of lighting devices. The device information can include at least one of the model name, the output color, the color temperature, and the watts of the lighting device. The RSSI information can include the RSSI of at least one other lighting device measured by the lighting device. The communication unit 301 can transmit the message for controlling at least one of the brightness, the light output time, and the light color of the lighting device, to the plurality of lighting devices.

According to an embodiment of the present disclosure, the communication unit 301 can include an RSSI receiver (not shown). The RSSI receiver (not shown) can receive the signals from the plurality of lighting devices and measure the RSSI of the received signals.

The display/input unit 303 can include at least one of a touch screen for providing an input/output interface between the electronic device and the user, a sound output unit for outputting a sound signal, and a printer for printing a document or an object. The display/input unit 303 can be divided into the touch screen, the sound output unit, and the printer. The display/input unit 303 can provide an interface for user touch input/output. More specifically, the display/input unit 303 can act as a medium for forwarding the user touch input to the electronic device and showing the output of the electronic device to the user. The display/input unit 303 can provide a visual output to the user. For example, the display/input unit 303 can output a device image recognized by a camera of the electronic device. The visual output can include text, graphic, video, and their combination. The display/input unit 303 can adopt various display technologies. For example, the display/input unit 303 can employ a Liquid Crystal Display (LCD), a Light Emitting Diode (LED), a Light emitting Polymer Display (LPD), an Organic LED (OLED), an Active Matrix OLED (AMOLED), or a Flexible LED (FLED). The touch screen of the display/input unit 303 is not limited to a touch screen using those display technologies. The touch screen can be divided into a screen display unit and an input unit. In addition to the typical function, the display/input unit 303 can display the plurality of lighting devices according to the RSSI of the signals. The display/input unit 303 can further display at least one of the UI for controlling the at least one lighting device, the result of grouping the lighting devices, the light icons, the light names, the light settings, at least one group icon, at least one group name, and at least one group setting. The display/input unit 303 can display the positions of the lighting devices on the floor plan of the area including the lighting devices. The display/input unit 303 can display the result of recognizing the lighting devices using at least one of the multiple lists, the multiple icons, the multiple items, and their combination. The display/input unit 303 can display the lighting device in order of recognizing the lighting devices.

The storage unit 305 stores microcode and various reference data of a program for the processing and the controlling of the control unit 307. According to the typical function, the storage unit 305 can store at least one of the device information including at least one of the model name, the output color, the color temperature, and the watts of the lighting device, and the RSSI information including the RSSI of at least one other lighting device measured by the lighting device.

The control unit 307 controls the operations of the control device 100. For example, the control unit 307 processes and controls voice communication and data communication. In addition to the typical function, the control unit 307 can measure the RSSI of the signals received from the lighting devices. The control unit 307 can group at least one lighting device based on at least one of the RSSI of the signals received from the lighting devices, the device information, and the RSSI information received from the lighting devices. The control unit 307 can generate the message for controlling the at least one lighting device.

Figure 4:
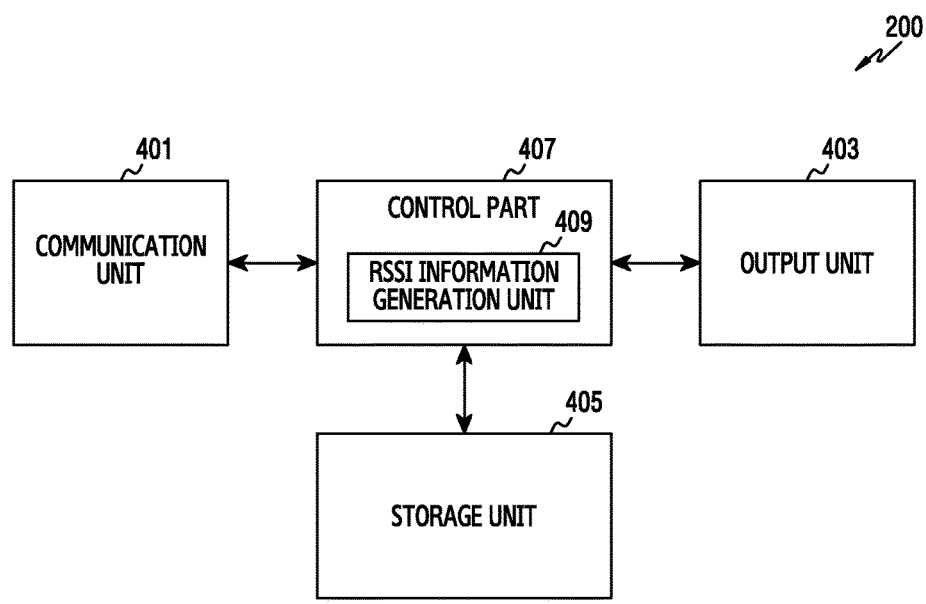
FIG. 4 is a block diagram of a lighting device according to an embodiment of the present disclosure.

FIG. 4 is a block diagram of a lighting device according to an embodiment of the present disclosure.

Referring to FIG. 4, the lighting device 200 includes a communication unit 401, an output unit 403, a storage unit 405, a control unit 407, and an RSSI information generation unit 409.

The communication unit 401 processes to transmit and receive radio signals of data input and output via an antenna. For example, in the transmission, the communication unit 401 channel-encodes, RF-processes, and transmits data to transmit. In the reception, the communication unit 401 converts a received RF signal to a baseband signal and restores data by channel-decoding the baseband signal. In addition to those typical functions, the communication unit 401 can receive the message requesting to transmit at least one of the device information and the RSSI information of the lighting device 200 from the control device 100. The communication unit 401 can transmit at least one of the device information and the RSSI information to the control device 100 according to the request message. The device information can include at least one of the model name, the output color, the color temperature, and the watts of the lighting device 200. The RSSI information can include the RSSI of at least one other lighting device measured by the lighting device 200. The communication unit 401 can receive the control message from the control device 100.

According to an embodiment of the present disclosure, the communication unit 401 can include an RSSI receiver (not shown). The RSSI receiver (not shown) can receive the signal from at least one of at least one other electronic device and the control device 100 and thus measure the RSSI of the received signal.

The output unit 403 indicates a light output device. For example, the light output unit 403 indicating a light emitting device. The output unit 403 can adopt various display technologies, for example, an LCD, an LED, an LPD, an OLED, an AMOLED, or an FLED. The output unit 403 can output the light according to the RSSI from the control device 100.

The storage unit 405 stores microcode and various reference data of a program for the processing and the controlling of the control unit 407. According to the typical function, the storage unit 405 can store at least one of the device information including at least one of the model name, the output color, the color temperature, and the watts of the lighting device, and the RSSI information including the RSSI of at least one other lighting device measured by the lighting device 200.

The control unit 407 controls the operations of the lighting device 200. For example, the control unit 407 processes and controls voice communication and data communication. In addition to the typical function, the control unit 407 can measure the RSSI of the signals received from the control device 100. The control unit 407 can control at least one of the brightness, the light output time, and the light color of the lighting device 200 according to the control message received from the control device 100. The control unit 407 can control the light brightness according to the RSSI of the signal received from the control device 100.

Figure 5:
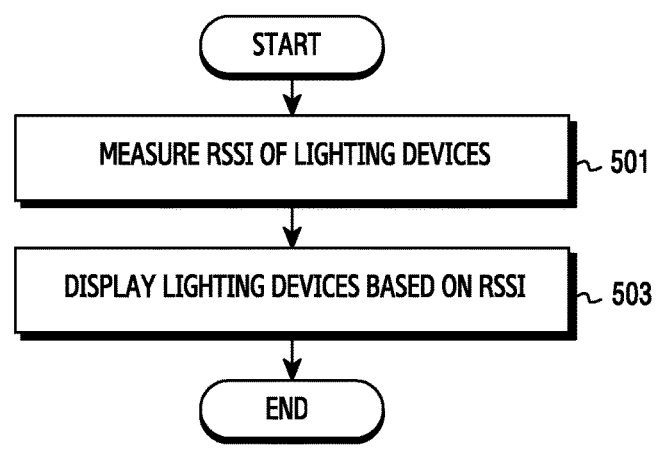
FIG. 5 is a flowchart of an electronic device according to an embodiment of the present disclosure.

FIG. 5 is a flowchart of an electronic device according to an embodiment of the present disclosure.

Referring to FIG. 5, the control device 100 measures the RSSI of signals received from a plurality of lighting devices in operation 501. The control device 100 can transmit a message requesting to transmit at least one of the device information and the RSSI information of the lighting device, to the lighting devices. The control device 100 can receive at least one of the device information and the RSSI information of the lighting device, from the lighting devices. The device information can include at least one of the model name, the light output color, the color temperature, and the watts of the lighting device. The RSSI information can include the RSSI of at least one other lighting device measured by the lighting device. The at least one lighting device can be grouped based on at least one of the RSSI of the signals received from the lighting devices, the device information, and the RSSI information received from the lighting devices. The control device 100 can generate a message for controlling the at least one lighting device. The control device 100 can transmit a message for controlling at least one of the brightness, the light output time, the light color of the lighting device, to at least one lighting device.

In operation 503, the control device 100 displays the lighting devices according to the RSSI of the signals. The control device 100 can further display at least one of the UI for controlling the at least one lighting device, the result of grouping the lighting devices, the light icons, the light names, the light settings, at least one group icon, at least one group name, and at least one group setting. The control device 100 can display positions of the lighting devices in a floor plan of an area including the lighting devices. The control device 100 can display the result of recognizing the lighting devices using at least one of multiple lists, multiple icons, multiple items, and their combination. The control device 100 can display the lighting device in order of recognizing the lighting devices.

Figure 6:
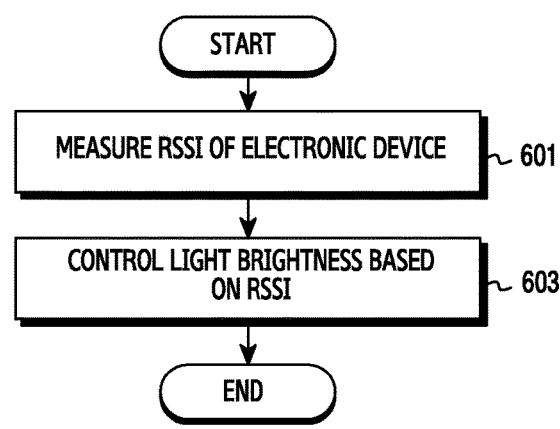
FIG. 6 is a flowchart of a lighting device according to an embodiment of the present disclosure.

FIG. 6 is a flowchart of a lighting device according to an embodiment of the present disclosure.

Referring to FIG. 6, the lighting device 200 measures the RSSI of a signal received from the control device 100 in operation 601. The lighting device 200 can receive from the control device 100 a message requesting to transmit at least one of the device information and the RSSI information of the lighting device 200. According to the request message, the lighting device 200 can transmit at least one of the device information and the RSSI information to the control device 100. The device information can include at least one of the model name, the output color, the color temperature, and the watts of the lighting device. The RSSI information can include the RSSI of at least one other lighting device measured by the lighting device 200.

In operation 603, the lighting device 200 outputs the light according to the RSSI. The lighting device 200 can receive a control message from the electronic control 100. According to the control message received from the control device 100, the lighting device 200 can control at least one of brightness, light output time, and light color of the lighting device 200. The lighting device 200 can control the light brightness according to the RSSI of the signal received from the control device 100.

Figure 7:
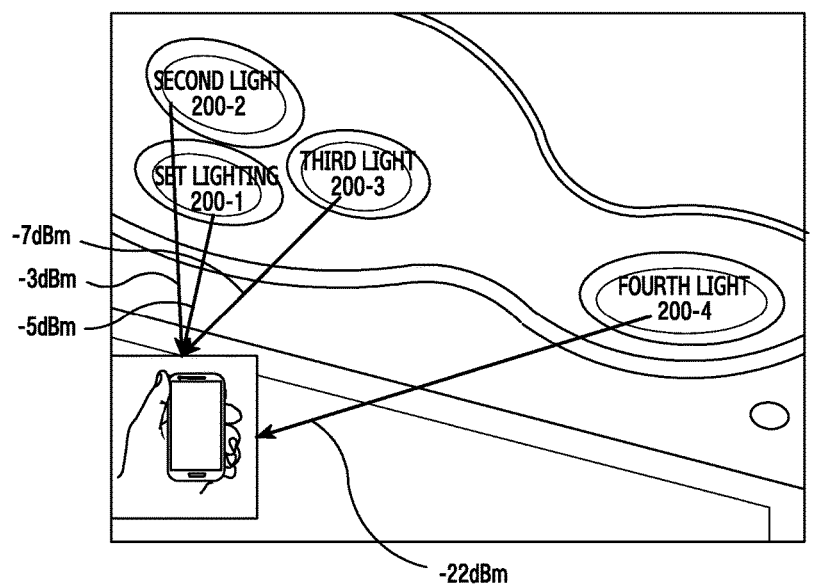
FIG. 7 illustrates a measurement of signals received at a control device from lighting devices according to an embodiment of the present disclosure.

FIG. 7 illustrates a measurement of signals received at a control device from lighting devices according to an embodiment of the present disclosure.

Referring to FIG. 7, the control device 100 can receive arbitrary signals from the first lighting device 200-1 through the fourth lighting device 200-4 at preset cycles. The control device 100 can determine the RSSI of the first lighting device 200-1 through the fourth lighting device 200-4 based on the arbitrary signals received from the first lighting device 200-1 through the fourth lighting device 200-4. The unit of the RSSI is (−) dBm. For example, the control device 100 can determine the RSSI of the arbitrary signal received from the first lighting device 200-1 as −3 dBm. The control device 100 can determine the RSSI of the arbitrary signal received from the second lighting device 200-2 as −7 dBm. The control device 100 can determine the RSSI of the arbitrary signal received from the third lighting device 200-3 as −5 dBm. The control device 100 can determine the RSSI of the arbitrary signal received from the fourth lighting device 200-4 as −22 dBm.

Figure 8A:
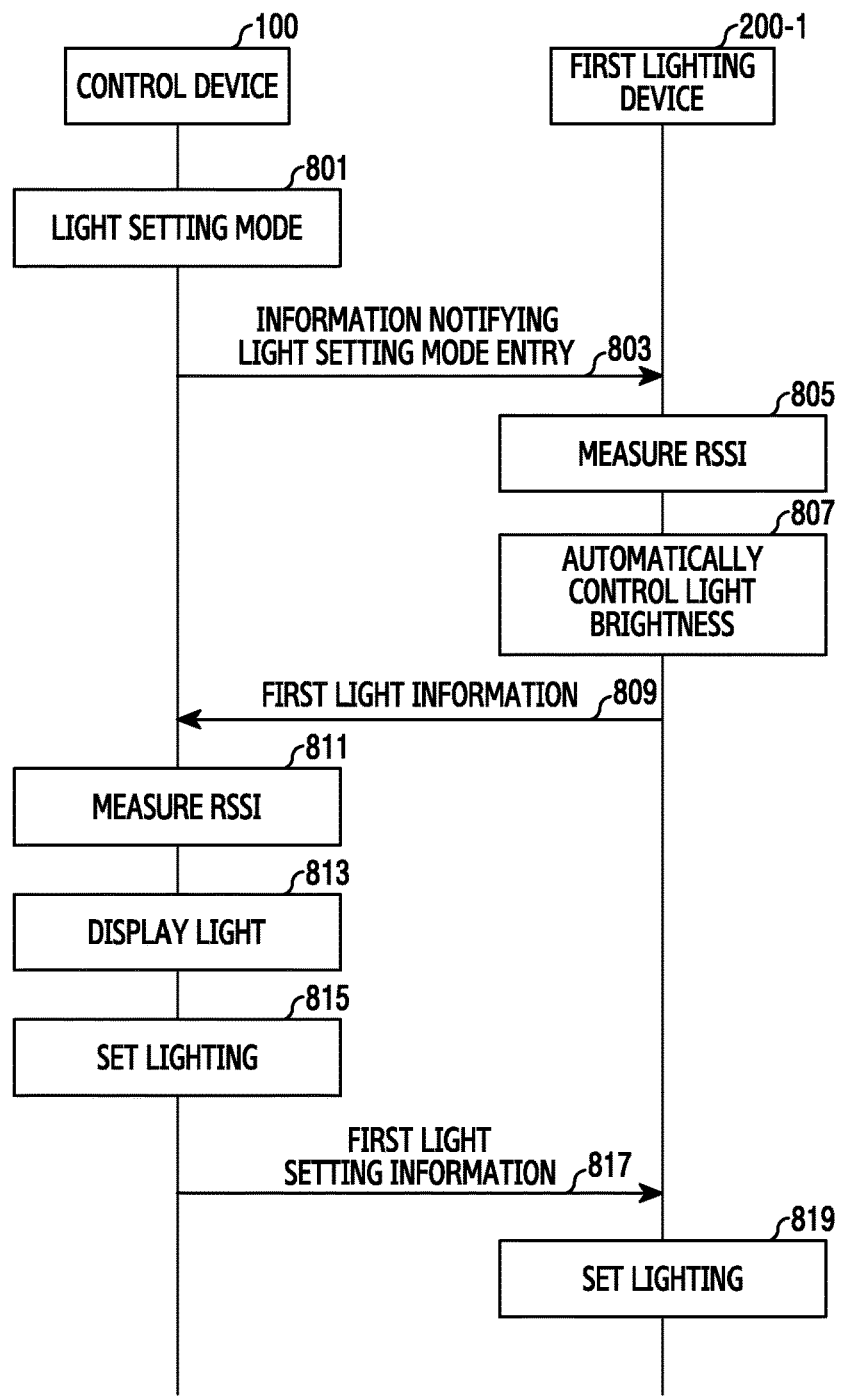
FIGS. 8A and 8B are signal flow diagrams between a control device and a lighting device according to an embodiment of the present disclosure.
Figure 8B:
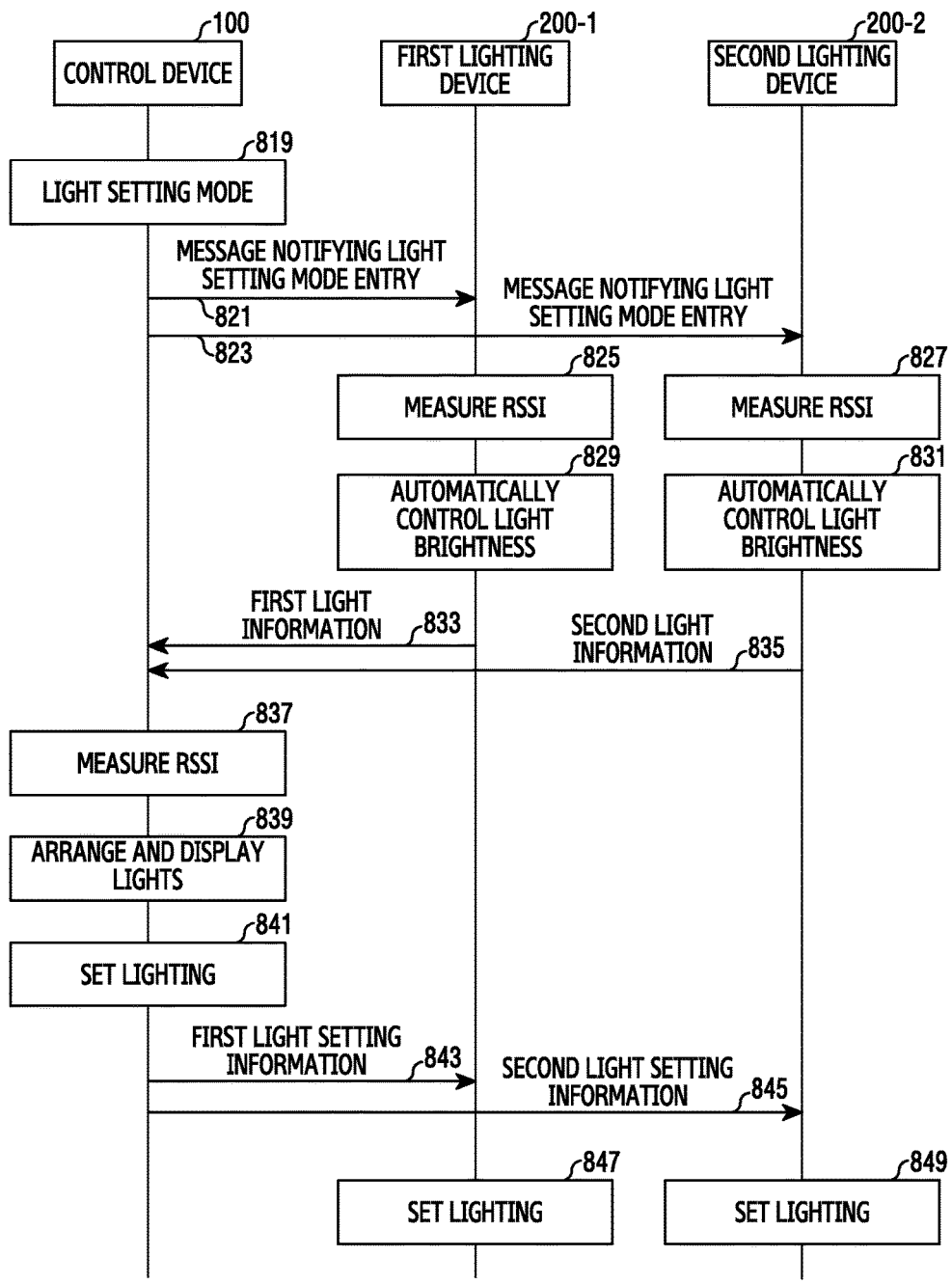

FIGS. 8A and 8B are signal flow diagrams between a control device and a lighting device according to an embodiment of the present disclosure.

Referring to FIG. 8A, the control device 100 enters the light setting mode in operation 801. Thereafter, the control device transmits a message notifying the light setting mode entry to the first lighting device 200-1.

In operation 803, the first lighting device 200-1 receives the message notifying the light setting mode entry from the control device 100.

The message notifying the light setting mode entry can include a message requesting first light information of the first lighting device 200-1. For example, the first light information can include at least one of the model name, the output color, the color temperature, and the watts of the first lighting device 200-1. According to an embodiment of the present disclosure, the message notifying the light setting mode entry may not include the message requesting the first light information. For example, before transmitting the message notifying the light setting mode entry to the first lighting device 200-1, the control device 100 can transmit the message requesting the first light information. Alternatively, after transmitting the message notifying the light setting mode entry to the first lighting device 200-1, the control device 100 can transmit the message requesting the first light information. For example, the time for the control device 100 to transmit the message requesting the first light information can differ.

The first lighting device 200-1 can receive an arbitrary signal from the control device 100 at a preset cycle. The arbitrary signal indicates a signal for the first lighting device 200-1 to measure the RSSI from the control device 100. For example, the control device 100 can transmit the arbitrary signal to the first lighting device 200-1 at the preset cycles so that the first lighting device 200-1 can measure the RSSI from the control signal 100.

In operation 805, the first lighting device 200-1 measures the RSSI of the arbitrary signal. The first lighting device 200-1 automatically controls the light brightness of the first lighting device 200-1 based on the RSSI in operation 807. The first lighting device 200-1 can automatically control the light brightness based on the RSSI and the preset RSSI threshold. The RSSI measured by the first lighting device 200-1 can vary according to movement of the control device 100. For example, the RSSI measured by the first lighting device 200-1 can vary according to a distance change between the control device 100 and the first lighting device 200-1. Hence, the first lighting device 200-1 can control to increase or decrease the light brightness according to the preset criterion based on the movement of the control device 100.

In operation 809, the first lighting device 200-1 can transmit the first light information to the control device 100. The control device 100 can receive an arbitrary signal from the first lighting device 200-1 at a preset cycle. The arbitrary signal indicates a signal for the control device 100 to measure the RSSI from the first lighting device 200-1. For example, the first lighting device 200-1 can transmit the arbitrary signal to the control device 100 at the preset cycles so that the control device 100 can measure the RSSI from the first lighting device 200-1.

In operation 811, the control device 100 can measure the RSSI based on the arbitrary signal. In operation 813, the control device 100 displays the light based on the RSSI. For example, the control device 100 can display the light setting UI on the screen display unit of the control device 100. The light setting UI indicates a UI for controlling the first lighting device 200-1. For example, the control device 100 can display an icon corresponding to the first lighting device 200-1 on the screen display unit of the control device 100.

In operation 815, the control device 100 can generate first light setting information of the first lighting device 200-1 according to a user's input signal through the light setting UI. In operation 817, the control device 100 transmits the first light setting information to the first lighting device 200-1. In operation 819, the first lighting device 200-1 sets the lighting of the first lighting device 200-1 based on the first light setting information.

Referring to FIG. 8B, the control device 100 can control the lighting devices 200-1 through 200-4. For example, the control device 100 enters the light setting mode in operation 819. In operation 821, the control device 100 transmits a message notifying the light setting mode entry to the first lighting device 200-1. In operation 823, the control device 100 transmits a message notifying the light setting mode entry to the second lighting device 200-2.

The message notifying the light setting mode entry can include a message requesting information of the first lighting device 200-1. For example, the message notifying the light setting mode entry can include a message requesting information of the second lighting device 200-2.

For example, the information of the first lighting device 200-1 can include at least one of the model name, the output color, the color temperature, and the watts of the first lighting device 200-1. The information of the second lighting device 200-2 can include at least one of the model name, the output color, the color temperature, and the watts of the second lighting device 200-2.

According to an embodiment of the present disclosure, the message notifying the light setting mode entry may not include the message requesting the information of the first lighting device 200-1 or the second lighting device 200-2. For example, before transmitting the message notifying the light setting mode entry to the first lighting device 200-1, the control device 100 can transmit the message requesting the information of the first lighting device 200-1. Alternatively, after transmitting the message notifying the light setting mode entry to the first lighting device 200-1, the control device 100 can transmit the message requesting the information of the first lighting device 200-1. For example, the time for the control device 100 to transmit the message requesting the information of the first lighting device 200-1 can differ. Similarly, the time for the control device 100 to transmit the message requesting the information of the second lighting device 200-2 can differ.

The first lighting device 200-1 and the second lighting device 200-2 can receive an arbitrary signal from the control device 100 at a preset cycle. The arbitrary signal indicates a signal for the first lighting device 200-1 and the second lighting device 200-2 to measure the RSSI from the control device 100. For example, the control device 100 can transmit the arbitrary signal to the first lighting device 200-1 and the second lighting device 200-2 at the preset cycles so that the first lighting device 200-1 and the second lighting device 200-2 can measure the RSSI from the control signal 100.

In operations 825 and 827, the first lighting device 200-1 and the second lighting device 200-2 measure the RSSI of the arbitrary signal. The first lighting device 200-1 automatically controls the light brightness of the first lighting device 200-1 based on the RSSI in operation 829. The second lighting device 200-2 automatically controls the light brightness of the second lighting device 200-2 based on the RSSI in operation 831.

The first lighting device 200-1 and the second lighting device 200-2 can automatically control their light brightness according to the RSSI and the preset RSSI threshold. The RSSI measured by the first lighting device 200-1 and the second lighting device 200-2 can vary according to the movement of the control device 100. For example, the RSSI measured by the first lighting device 200-1 and the second lighting device 200-2 can vary according to the distance changes between the control device 100 and the first lighting device 200-1 and the second lighting device 200-2. Hence, the first lighting device 200-1 and the second lighting device 200-2 can control to increase or decrease the light brightness according to the preset criterion based on the movement of the control device 100.

In operation 833, the first lighting device 200-1 transmits first light information of the first lighting device 200-1 to the control device 100. In operation 835, the second lighting device 200-2 transmits second light information of the second lighting device 200-2 to the control device 100.

The control device 100 can receive arbitrary signals from the first lighting device 200-1 and the second lighting device 200-2 at a preset cycle. The arbitrary signal indicates a signal for the control device 100 to measure the RSSI from the first lighting device 200-1 and the second lighting device 200-2. For example, the first lighting device 200-1 can transmit the arbitrary signal to the control device 100 at the preset cycles so that the control device 100 can measure the RSSI from the first lighting device 200-1. The second lighting device 200-2 can transmit the arbitrary signal to the control device 100 at the preset cycles so that the control device 100 can measure the RSSI from the second lighting device 200-2.

In operation 837, the control device 100 can measure the RSSI based on the arbitrary signal. In operation 839, the control device 100 can display the light setting UI on the screen display unit of the control device 100 based on the RSSI. The light setting UI indicates a UI for controlling the first lighting device 200-1 and the second lighting device 200-2.

In operation 841, the control device 100 can generate first light setting information of the first lighting device 200-1 according to a user's input signal through the light setting UI. The control device 100 can generate second light setting information of the second lighting device 200-2 according to a user's input signal through the light setting UI.

In operation 843, the control device 100 transmits the first light setting information to the first lighting device 200-1. In operation 845, the control device 100 transmits the second light setting information to the second lighting device 200-2.

In operation 847, the first lighting device 200-1 sets the lighting of the first lighting device 200-1 based on the first light setting information. In operation 849, the second lighting device 200-2 sets the lighting of the second lighting device 200-2 based on the second light setting information.

In FIGS. 8A and 8B, the two lighting devices 200-1 and 200-2 are depicted to ease the understanding. According to various embodiments of the present disclosure, the number of the lighting devices can exceed three.

Figure 9:
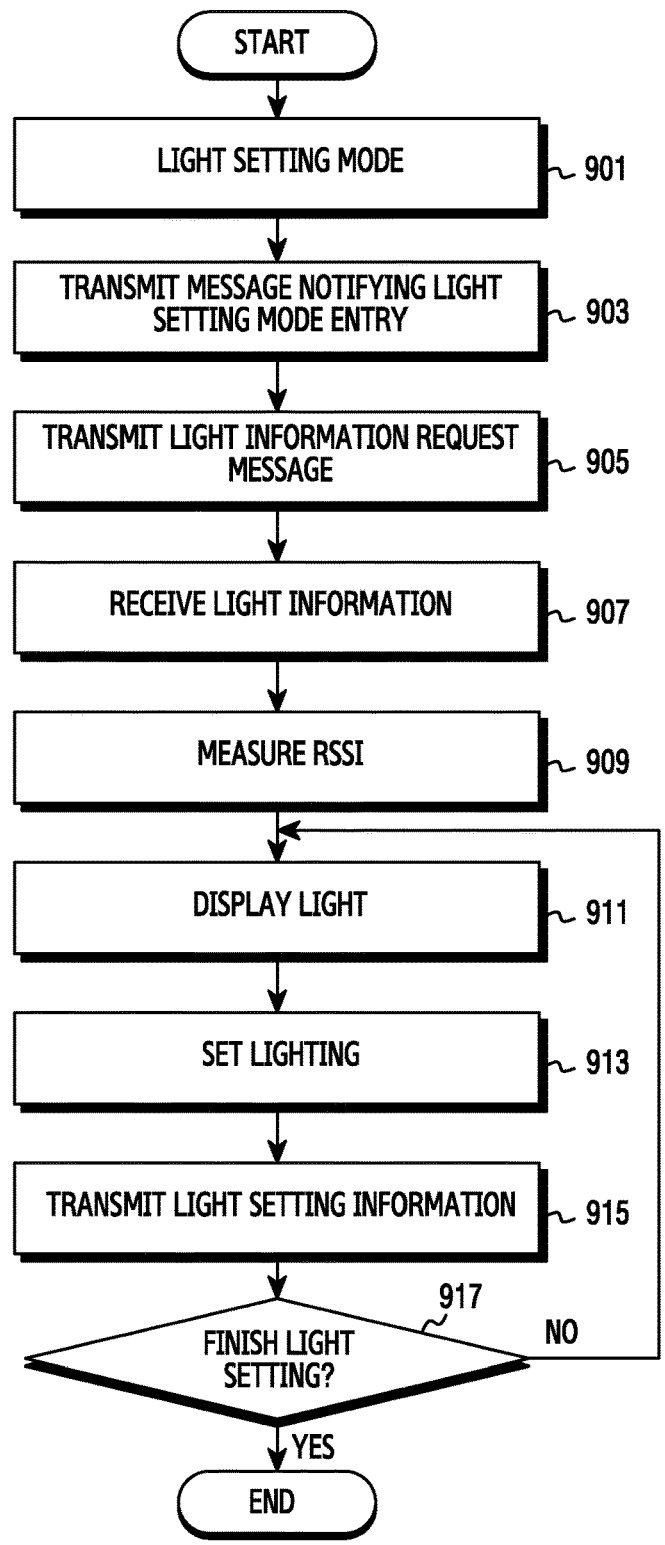
FIG. 9 is a flowchart of a control device according to an embodiment of the present disclosure.

FIG. 9 is a flowchart of a control device according to an embodiment of the present disclosure.

Referring to FIG. 9, the control device 100 enters the light setting mode in operation 901. In operation 903, the control device 100 transmits the message notifying the light setting mode entry to at least one lighting device.

In operation 905, the control device 100 transmits the message requesting light information to at least one lighting device. The message notifying the light setting mode entry can include the message requesting the light information. The time for the control device 100 to transmit the message requesting the light information can differ.

In operation 907, the control device 100 receives light information from the at least one lighting device. The light information can include at least one of the model name, the output color, the color temperature, and the watts of the at least one lighting device transmitting the light information.

In operation 909, the control device 100 measures the RSSI. The control device 100 can receive an arbitrary signal from the at least one lighting device at a preset cycle. The arbitrary signal indicates a signal for measuring the RSSI from the at least one lighting device in the control device 100. For example, the at least one lighting device can transmit the arbitrary signal to the control device 100 at the preset cycles so that the control device 100 can measure the RSSI from the at least one lighting device.

In operation 911, the control device 100 can display at least one light on the screen display unit of the control device 100 based on the RSSI. For example, the control device 100 can display the light setting UI on the screen display unit of the control device 100. The light setting UI indicates a UI for controlling the at least one lighting device.

In operation 913, the control device 100 can generate light setting information of the at least one lighting device according to a user's input signal through the light setting UI.

In operation 915, the control device 100 transmits the light setting information to the at least one lighting device. In operation 917, the control device 100 determines whether the setting of the at least one lighting device is finished. The control device 100 can determine whether the setting of the at least one lighting device is finished, based on the user's input signal through the light setting UI. When the setting of the at least one lighting device is finished, the control device 100 can transmit a message notifying the setting end to the at least one lighting device.

When the setting of the at least one lighting device is not finished, the control device 100 returns to operation 911.

Figure 10:
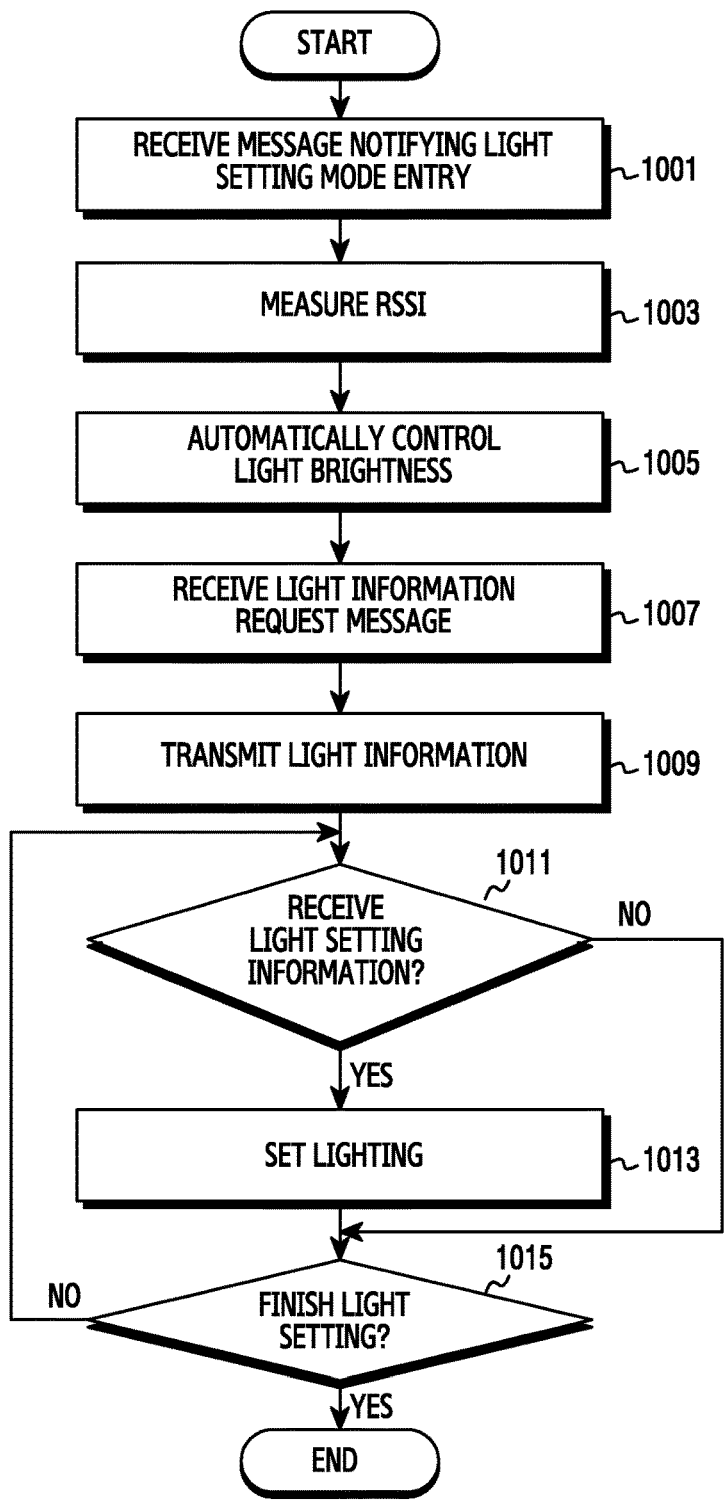
FIG. 10 is a flowchart of a lighting device according to an embodiment of the present disclosure.

FIG. 10 is a flowchart of a lighting device according to an embodiment of the present disclosure.

Referring to FIG. 10, in operation 1001, the lighting device 200 receives information notifying the light setting mode entry. Upon entering the light setting mode, the control device 100 can transmit the message to the lighting device 200.

In operation 1003, the lighting device 200 measures the RSSI from the control device 100. The lighting device 200 can receive an arbitrary signal from the control device 100 at a preset cycle. The arbitrary signal indicates a signal for the lighting device 200 to measure the RSSI from the control device 100. For example, the control device 100 can transmit the arbitrary signal to the lighting device 200 at the preset cycles so that the lighting device 200 can measure the RSSI from the control signal 100.

In operation 1005, the lighting device 200 automatically controls the light brightness of the lighting device 200. The lighting device 200 can automatically control the light brightness based on the RSSI. For example, the lighting device 200 can automatically control the light brightness according to the RSSI and a preset RSSI threshold. The RSSI measured by the lighting device 200 can vary according to movement of the control device 100. For example, the RSSI measured by the lighting device 200 can vary according to the distance change between the control device 100 and the lighting device 200. Hence, the lighting device 200 can control to increase or decrease the light brightness according to the preset criterion based on the movement of the control device 100.

In operation 1007, the lighting device 200 receives the message requesting light information of the lighting device 200. The message notifying the light setting mode entry can include the message requesting the light information.

According to an embodiment of the present disclosure, before receiving the message notifying the light setting mode entry, the lighting device 200 can receive the message requesting the light information. For example, the time for the lighting device 200 to receive the message requesting the light information can differ.

In operation 1009, the lighting device 200 transmits the light information to the control device 100. The light information can include at least one of the model name, the output color, the color temperature, and the watts of the lighting device 200.

In operation 1011, the lighting device 200 determines whether the light setting information is received. The light setting information indicates the setting information of the lighting device 200 generated by the control device 100.

Upon receiving the light setting information, the lighting device 200 sets the lighting based on the light setting information in operation 1013.

In operation 1015, the lighting device 200 determines whether setting of the lighting device 200 is finished. The lighting device 200 can receive the message notifying setting end of the lighting device 200 from the control device 100. Based on the message notifying the setting end of the lighting device 200, the lighting device 200 can determine whether setting of the lighting device 200 is finished.

When the setting is not finished, the lighting device 200 goes back to operation 1011.

Figure 11A:
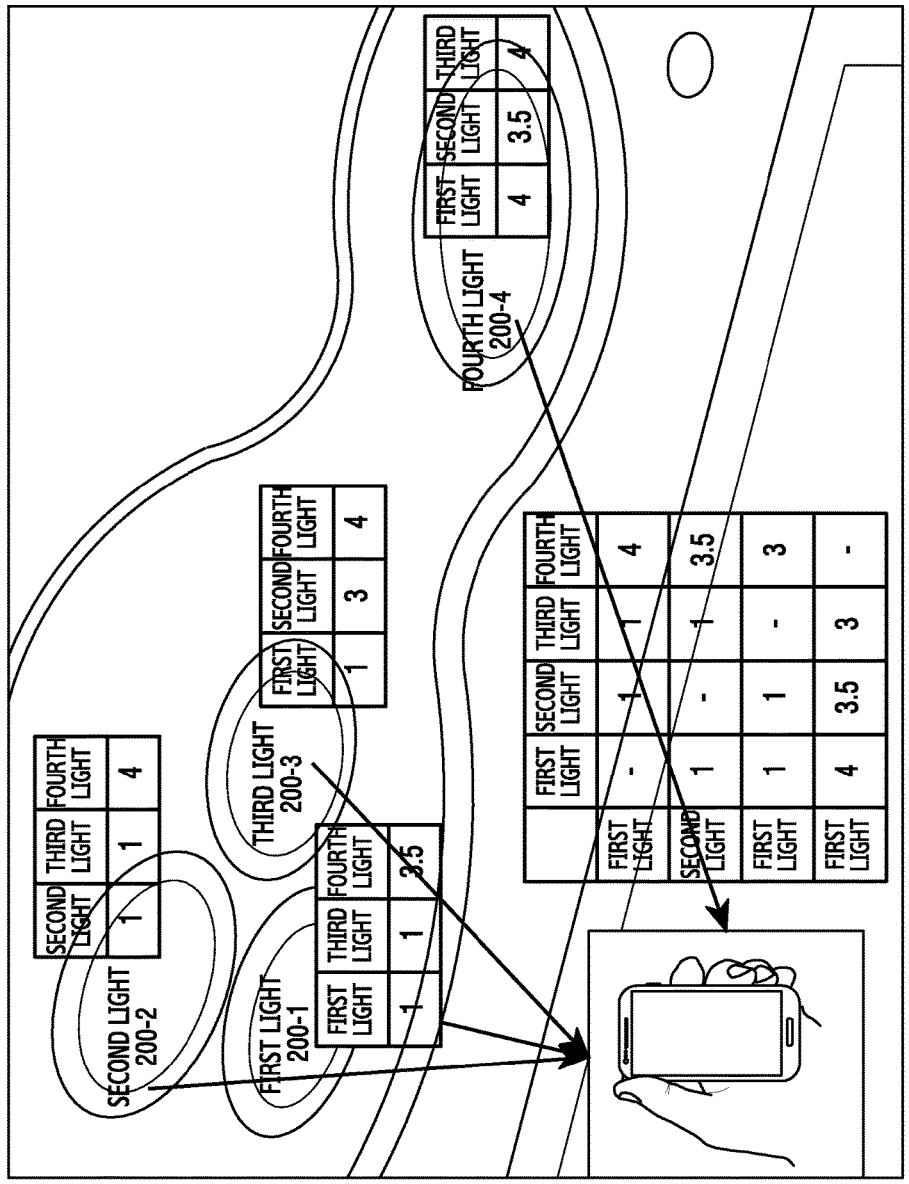
FIGS. 11A and 11B illustrate received signal strength indicator (RSSI) information received at a control device from lighting devices according to an embodiment of the present disclosure.
Figure 11B:
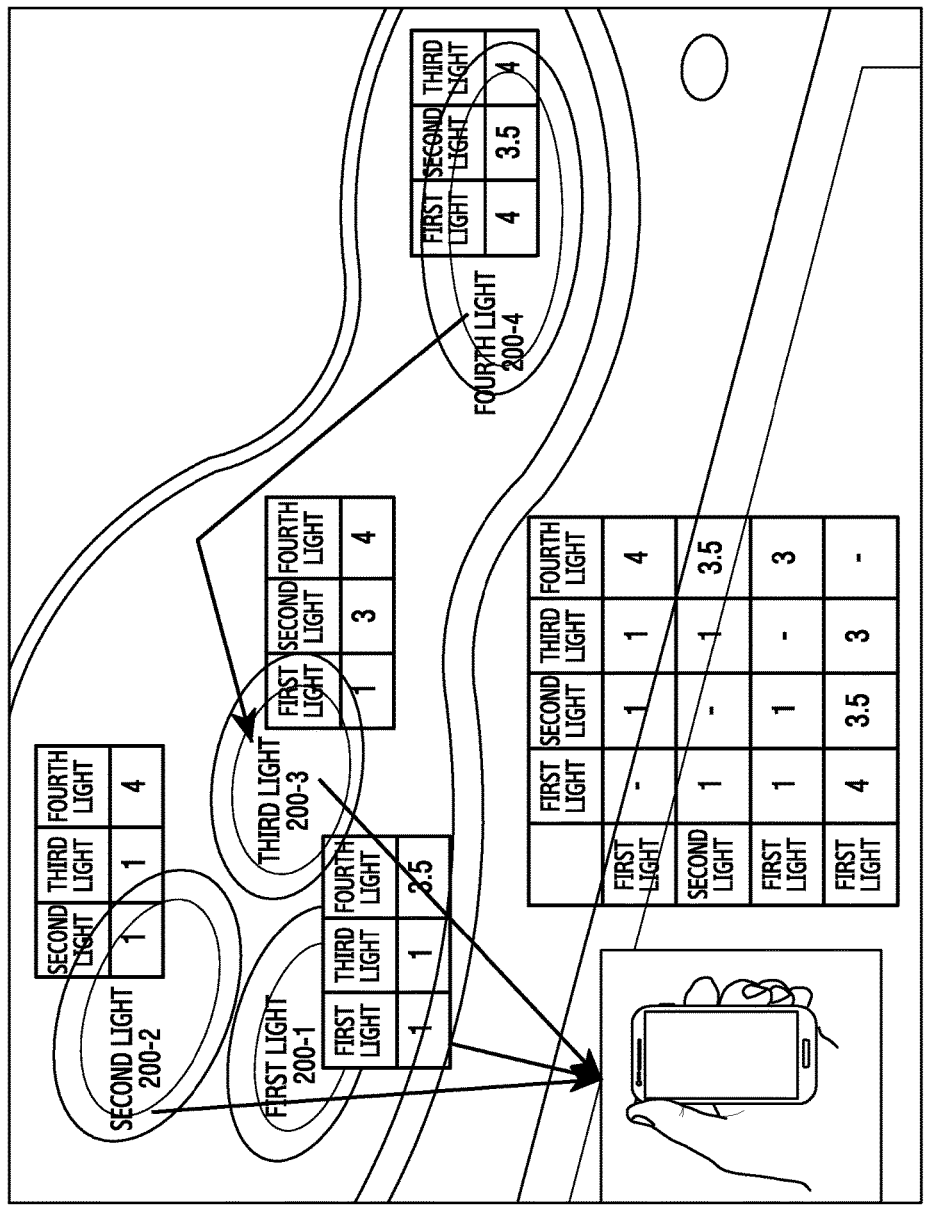

FIGS. 11A and 11B illustrate RSSI information received at a control device from lighting devices according to an embodiment of the present disclosure.

Referring to FIG. 11A, the lighting devices 200-1 through 200-4 can receive a defined signal. The lighting devices 200-1 through 200-4 can measure the RSSI of the defined signal. For example, the first lighting device 200-1 can generate RSSI information by measuring the RSSI of signals received from the second lighting device 200-2, the third lighting device 200-3, and the fourth lighting device 200-4. The RSSI can change according to a surrounding environment. For example, with an ambient noise, the RSSI can frequently change due to the noise. Thus, the lighting devices 200-1 through 200-4 can generate the RSSI information by converting the RSSI of a certain range to a preset representative value. For example, a value between −5 dBm and 0 dBm can be converted to 1, and a value below −10 dBm and −5 dBm can be converted to 2. For example, the RSSI information of the first lighting device 200-1 is shown in Table 1.

TABLE 1

| measurement object | second light | third light | fourth light |
|---|---|---|---|
| RSSI | 1 | 1 | 4 |

For example, RSSI information of the second lighting device 200-2 is shown Table 2.

TABLE 2

| measurement object | second light | third light | fourth light |
|---|---|---|---|
| RSSI | 1 | 1 | 3.5 |

For example, RSSI information of the third lighting device 200-3 is shown in Table 3.

TABLE 3

| measurement object | second light | third light | fourth light |
|---|---|---|---|
| RSSI | 1 | 3 | 4 |

For example, RSSI information of the fourth lighting device 200-4 is shown in Table 4.

TABLE 4

| measurement object | second light | third light | fourth light |
|---|---|---|---|
| RSSI | 4 | 3.5 | 3 |

The lighting devices 200-1 through 200-4 can generate such RSSI information, receive a message requesting the RSSI information from the control device 100, and transmit the RSSI information to the control device 100.

The control device 100 can receive the RSSI information from the lighting devices 200-1 through 200-4 and generate data integrating the RSSI information. For example, the integrated data is shown in Table 5.

TABLE 5

|  | first light | second light | third light | fourth light |
|---|---|---|---|---|
| first light | — | 1 | 1 | 4 |
| second light | 1 | — | 1 | 3.5 |
| third light | 1 | 1 | — | 3 |
| fourth light | 4 | 3.5 | 3 | — |

The control device 100 can control and group the lighting devices 200-1 through 200-4 according to the integrated RSSI information. The RSSI information can be generated as a table. For example, the control device 100 can group the first lighting device 200-1, the second lighting device 200-2, and the third lighting device 200-3 having the RSSI information value '1' among the lighting devices 200-1 through 200-4, into one group according to the data integrating the RSSI information received from the lighting devices 200-1 through 200-4.

According to an embodiment of the present disclosure, the control device 100 can group the lighting devices 200-1 through 200-4 according to the RSSI values of the lighting devices 200-1 through 200-4 measured by the control device 100. For example, the control device 100 can receive preset signals from the lighting devices 200-1 through 200-4 at a spot of the control device 100 and thus detect RSSI values of the signals received from the lighting devices 200-1 through 200-4. For example, according to the detected RSSI values, the control device 100 can group the lighting devices in a short range among the lighting devices 200-1 through 200-4, into one group. For example, according to the detected RSSI values, the control device 100 can determine that the first lighting device 200-1, the second lighting device 200-2, and the third lighting device 200-3 are close to each other and the fourth lighting device 200-54 is not close to the first lighting device 200-1, the second lighting device 200-2, and the third lighting device 200-3, and thus group the first lighting device 200-1, the second lighting device 200-2, and the third lighting device 200-3 into one group.

According to an embodiment of the present disclosure, the control device 100 can change the criterion for grouping the lighting devices 200-1 through 200-4. For example, the control device 100 can receive device information including at least one of a model name, an output color, a color temperature, and watts from the lighting devices 200-1 through 200-4. The control device 100 can group the lighting devices 200-1 through 200-4 according to the received device information. For example, the control device 100 can group lighting devices of the same model name among the lighting devices 200-1 through 200-4, into one group. The control device 100 can group lighting devices having the same watts among the lighting devices 200-1 through 200-4, into one group.

According to an embodiment of the present disclosure, the control device 100 can group the lighting devices 200-1 through 200-4 according to at least one of the RSSI values of the lighting devices 200-1 through 200-4 received from the lighting devices 200-1 through 200-4, the RSSI information generated by the lighting devices 200-1 through 200-4, the data integrating the received RSSI information generated by the lighting devices 200-1 through 200-4, and the device information received from the lighting devices 200-1 through 200-4.

The lighting devices 200-1 through 200-4 can dim the light at a short distance from the control device 100, and light up at a long distance from the control device 100. For example, the lighting devices 200-1 through 200-4 can control the light brightness based on the RSSI value according to a signal received from the control device 100. For example, the lighting devices 200-1 through 200-4 can control their light brightness based on a value representing the RSSI value range value according to the signal received from the control device 100. For example, the lighting devices 200-1 through 200-4 can determine the representative value corresponding to the RSSI value from 1 to 5, output the darkest light when the RSSI value range measured from the received signal of the control device 100 belongs to 1, and output the brightest light for 5. For example, the lighting devices 200-1 through 200-4 can determine the representative value of 1 when the RSSI value range is between −5 dBm and 0 dBm, the representative value of 2 when the RSSI value range is between −10 dBm and −5 dBm, and the representative value of 3 when the RSSI value range is between −15 dBm and −10 dBm. It is possible to set the representative value of the RSSI value measured by the lighting devices 200-1 through 200-4 and the light brightness corresponding to the representative value. The representative value according to the RSSI value range and the light brightness corresponding to the representative value are shown in Table 6.

TABLE 6

| measurement value (dBm) | representative value | light brightness |
|---|---|---|
| 0~−5 | 1 | 1 (most darkness) |
| −5~−10 | 2 | 2 (darkness) |
| −10~−15 | 3 | 3 (middle brightness) |
| −15~−20 | 4 | 4 (brightness) |
| −20~−25 | 5 | 5 (most brightness) |

For example, when the RSSI value of the control device 100 measured by the second lighting device 200-2 falls below −10 dBm and exceeds −15 dBm, the second lighting device 200-2 can output the light at the brightness corresponding to the representative value '3'. For example, when the RSSI value according to the signal received from the control device 100 measured by the fourth lighting device 200-4 falls below −20 dBm and exceeds −25 dBm, the fourth lighting device 200-4 can output the light at the brightness corresponding to the representative value '5'. The user can obtain the light brightness and determine the distance between the lighting devices 200-1 through 200-4 and the user. The user can match the lighting devices 200-1 through 200-4 listed and displayed based on the distance in the control device 100 with the light brightness of the lighting devices 200-1 through 200-4, and thus intuitively recognize the lighting devices displayed in the control device 100.

The light brightness according to the RSSI value of the control device measured by at least one of the lighting devices 200-1 through 200-4 can be controlled variously. For example, when the RSSI value falls below a threshold, the at least one lighting device can light up. By contrast, when the RSSI value of the control device measured by the at least one lighting device exceeds the threshold, the at least one lighting device can dim the light. For example, the light close to the control device can be lighted up, and the light away from the control device can be dimmed.

According to an embodiment of the present disclosure, the RSSI value range, the representative value corresponding to the RSSI value range, and the light brightness corresponding to the representative value can vary. The number of the lighting devices 200-1 through 200-4 can vary.

Referring to FIG. 11B, the fourth lighting device 200-4 can be located out of a communication range of the control device 100. The fourth lighting device 200-4 can transmit its RSSI information to at least one other lighting device in its communication range. For example, the fourth lighting device 200-4 can be located in the communication range with the first lighting device 200-1, the second lighting device 200-2, and the third lighting device 200-3. The fourth lighting device 200-4 can transmit its RSSI information to at least one of the first lighting device 200-1, the second lighting device 200-2, and the third lighting device 200-3. For example, the fourth lighting device 200-4 can transmit its RSSI information to the third lighting device 200-3. The third lighting device 200-3 can forward its RSSI information and the RSSI information of the fourth lighting device 200-4 to the control device 100.

Still referring to FIG. 11B, the control device 100 can receive the RSSI information of the fourth lighting device 200-4 via the third lighting device 200-3. For example, the control device 100 and the first lighting device 200-1 through the fourth lighting device 200-4 can build a short range communication mesh. The short range communication mesh can be referred to as a BLE mesh. The short range communication mesh indicates a communication network among a plurality of electronic devices each including a short range communication module. For example, the first lighting device 200-1, the second lighting device 200-2, and the third lighting device 200-3 can be in the communication range of the control device 100. By contrast, the fourth lighting device 200-4 is in the communication range of the first lighting device 200-1, the second lighting device 200-2, and the third lighting device 200-3 but out of the communication range of the control device 100. The control device 100 and the fourth lighting device 200-4 can communicate with each other using the short range communication mesh. For example, the control device 100 can transmit a message destined for the fourth lighting device 200-4, to the third lighting device 200-3 in its communication range. The third lighting device 200-3 can forward the message received from the control device 100, to the fourth lighting device 200-4. Similarly, the fourth lighting device 200-4 can transmit a response message of the message received via the third lighting device 200-3, to the third lighting device 200-3. The third lighting device 200-3 can forward the response message to the control device 100.

For example, the third lighting device 200-3 can forward the RSSI information of the fourth lighting device 200-4 received from the fourth lighting device 200-4, to the control device 100. That is, the control device 100 can receive the RSSI information of the fourth lighting device 200-4 being out of its communication range, via the third lighting device 200-3.

Figure 12A:
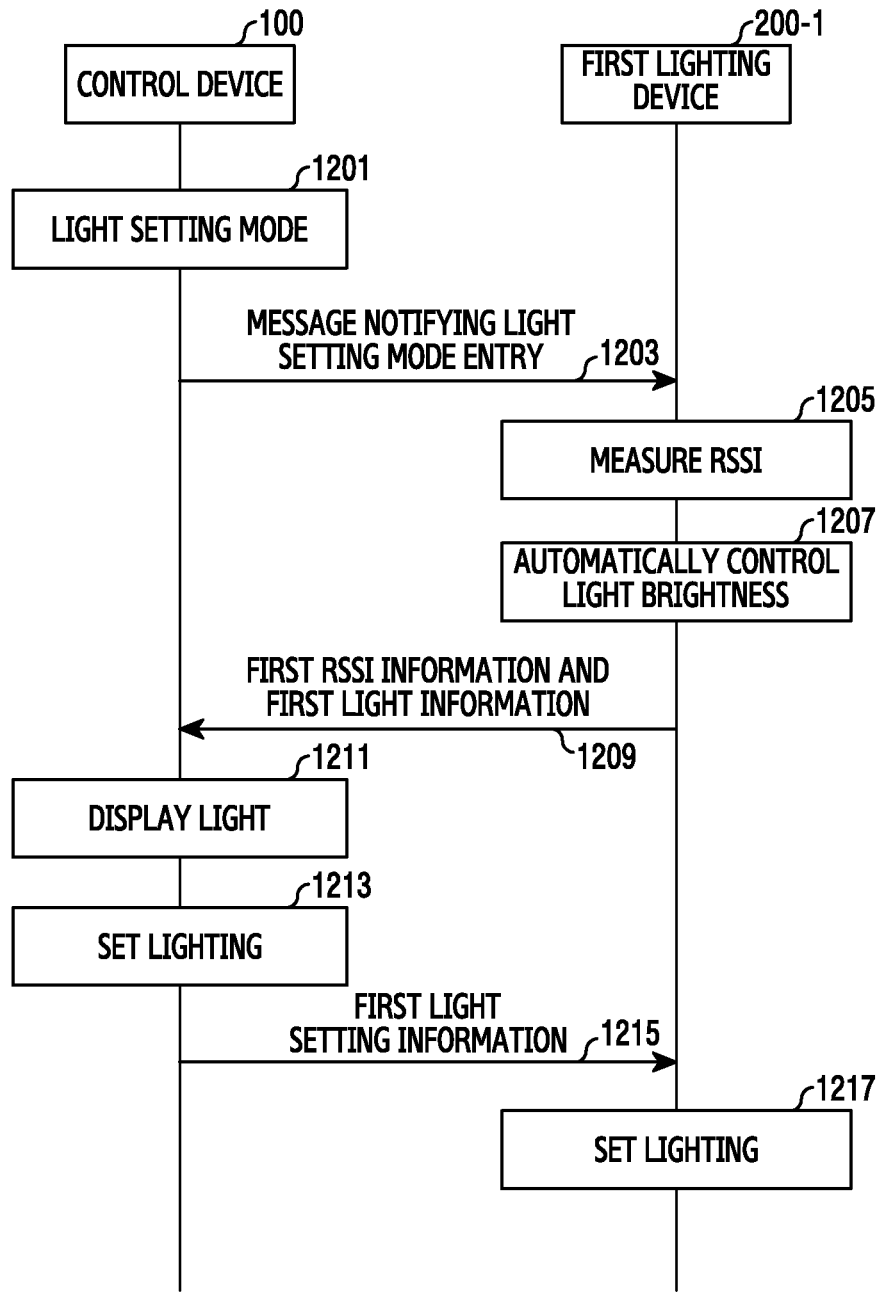
FIGS. 12A, 12B, and 12C are signal flow diagrams between a control device and a lighting device according to an embodiment of the present disclosure.
Figure 12B:
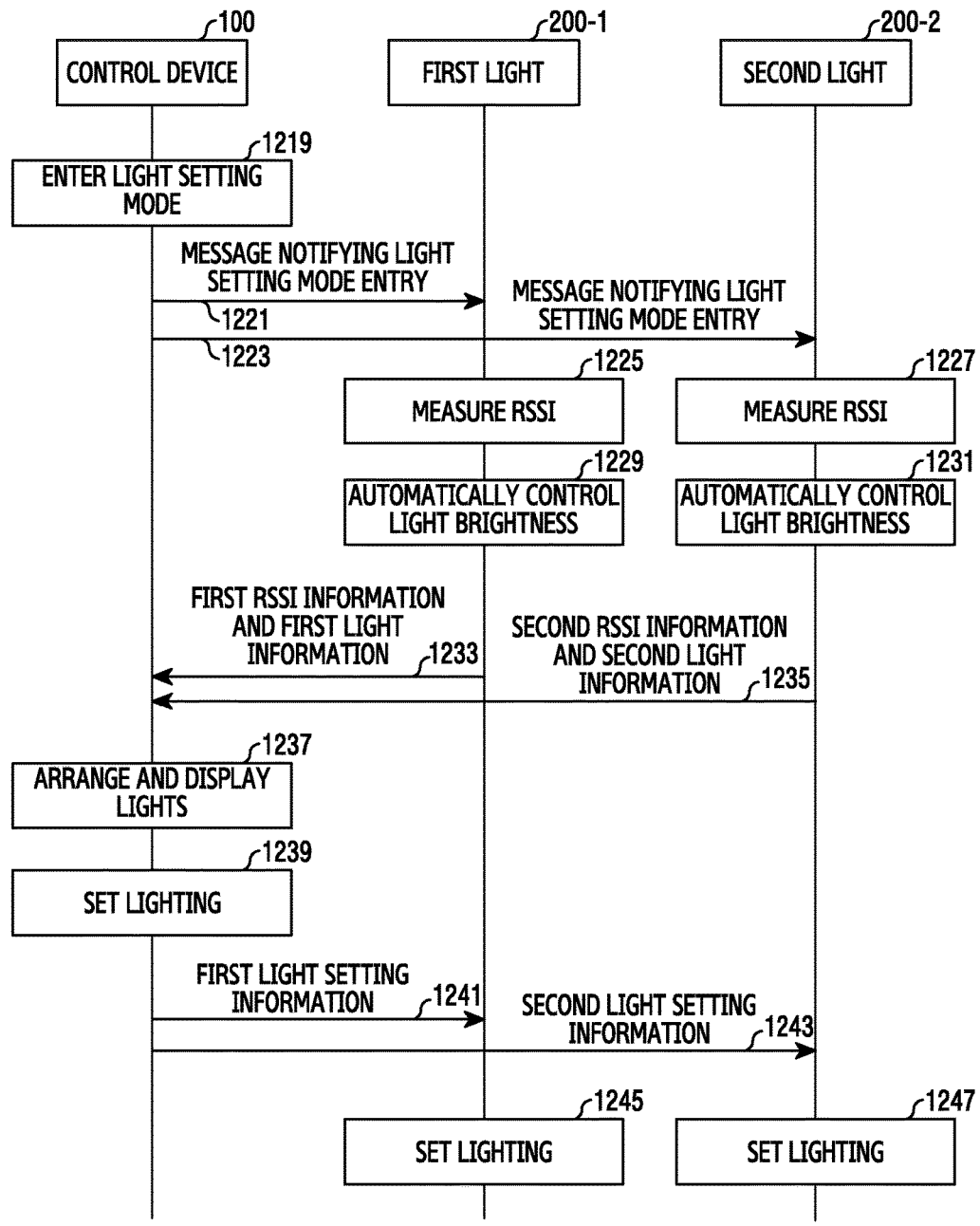
Figure 12C:
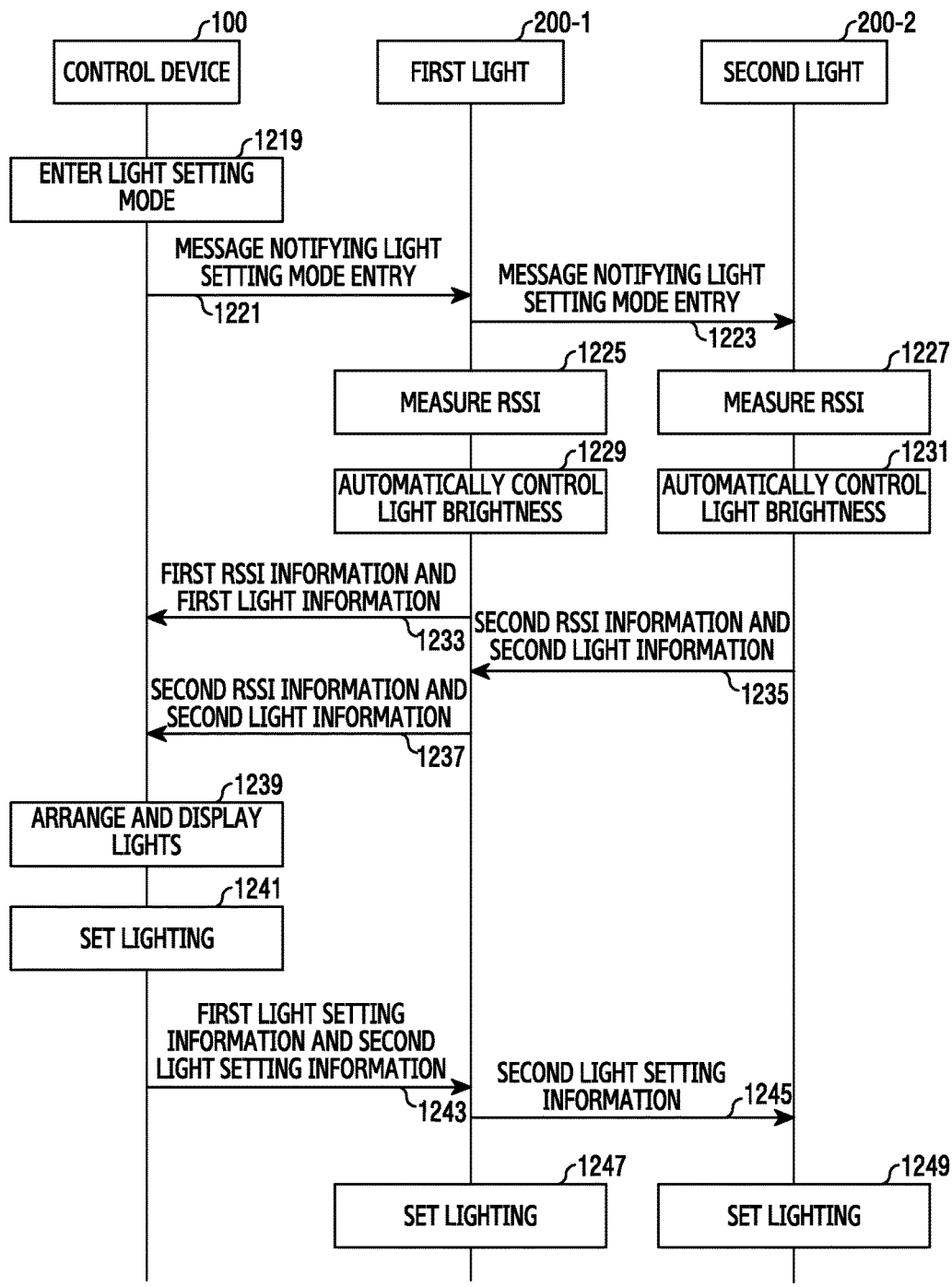

FIGS. 12A, 12B, and 12C are signal flow diagrams between a control device and a lighting device according to an embodiment of the present disclosure.

Referring to FIG. 12A, the control device 100 enters the light setting mode in operation 1201. Thereafter, the control device 100 transmits the message notifying the light setting mode entry to the first lighting device 200-1.

In operation 1203, the first lighting device 200-1 receives the message notifying the light setting mode entry from the control device 100.

The first lighting device 200-1 can receive an arbitrary signal from the control device 100 at a preset cycle. The arbitrary signal indicates the signal for the first lighting device 200-1 to measure the RSSI from the control device 100. For example, the control device 100 can transmit the arbitrary signal to the first lighting device 200-1 at the preset cycles so that the first lighting device 200-1 can measure the RSSI from the control signal 100.

In operation 1205, the first lighting device 200-1 measures the RSSI of the arbitrary signal. The first lighting device 200-1 automatically controls the light brightness of the first lighting device 200-1 based on the RSSI in operation 1207. The first lighting device 200-1 can automatically control the light brightness according to the RSSI and the preset RSSI threshold. The RSSI measured by the first lighting device 200-1 can vary according to movement of the control device 100. For example, the RSSI measured by the first lighting device 200-1 can vary according to the distance change between the control device 100 and the first lighting device 200-1. Hence, the first lighting device 200-1 can control to increase or decrease the light brightness according to the preset criterion based on the movement of the control device 100.

The message notifying the light setting mode entry in operation 1203 can include a message requesting first RSSI information generated by the first lighting device 200-1 and first light information of the first lighting device 200-1. According to an embodiment of the present disclosure, the message notifying the light setting mode entry may not include the message requesting the first RSSI information and the first light information. For example, before transmitting the message notifying the light setting mode entry to the first lighting device 200-1, the control device 100 can transmit the message requesting the first RSSI information and the first light information. Alternatively, after transmitting the message notifying the light setting mode entry to the first lighting device 200-1, the control device 100 can transmit the message requesting the first RSSI information and the first light information. For example, the time for the control device 100 to transmit the message requesting the first RSSI information and the first light information can differ.

In operation 1209, the first lighting device 200-1 transmits the first RSSI information and the first light information to the control device 100.

In operation 1211, the control device 100 can display the light setting UI on the screen display unit of the control device 100 based on the first RSSI information. The light setting UI indicates the UI for controlling the first lighting device 200-1.

In operation 1213, the control device 100 can generate first light setting information of the first lighting device 200-1 according to a user's input signal through the light setting UI. In operation 1215, the control device 100 transmits the first light setting information to the first lighting device 200-1. In operation 1217, the first lighting device 200-1 sets the lighting of the first lighting device 200-1 based on the first light setting information.

Referring to FIG. 12B, the control device 100 can control the lighting devices 200-1 through 200-4. For example, the control device 100 enters the light setting mode in operation 1219. In operation 1221, the control device 100 transmits a message notifying the light setting mode entry to the first lighting device 200-1. In operation 1223, the control device 100 transmits the message notifying the light setting mode entry to the second lighting device 200-2.

The first lighting device 200-1 and the second lighting device 200-2 can receive an arbitrary signal from the control device 100 at a preset cycle. The arbitrary signal indicates the signal for the first lighting device 200-1 and the second lighting device 200-2 to measure the RSSI from the control device 100. For example, the control device 100 can transmit the arbitrary signal to the first lighting device 200-1 and the second lighting device 200-2 at the preset cycles so that the first lighting device 200-1 and the second lighting device 200-2 can measure the RSSI from the control signal 100.

In operations 1225 and 1227, the first lighting device 200-1 and the second lighting device 200-2 measure the RSSI of the arbitrary signal. The first lighting device 200-1 automatically controls the light brightness of the first lighting device 200-1 based on the RSSI in operation 1229. The second lighting device 200-2 automatically controls the light brightness of the second lighting device 200-2 based on the RSSI in operation 1231.

The first lighting device 200-1 and the second lighting device 200-2 can automatically control their light brightness according to the RSSI and the preset RSSI threshold. The RSSI measured by the first lighting device 200-1 and the second lighting device 200-2 can vary according to movement of the control device 100. For example, the RSSI measured by the first lighting device 200-1 and the second lighting device 200-2 can vary according to the distance changes between the control device 100 and the first lighting device 200-1 and the second lighting device 200-2. Hence, the first lighting device 200-1 and the second lighting device 200-2 can control to increase or decrease the light brightness according to the preset criterion based on the movement of the control device 100.

The message notifying the light setting mode entry in operation 1221 can include the message requesting first RSSI information generated by the first lighting device 200-1 and second light information of the first lighting device 200-1. The message notifying the light setting mode entry in operation 1223 can include the message requesting second RSSI information generated by the second lighting device 200-2 and second light information of the second lighting device 200-2.

According to an embodiment of the present disclosure, the message notifying the light setting mode entry in operation 1221 may not include the message requesting the first RSSI information and the first light information. The message notifying the light setting mode entry in operation 1223 may not include the message requesting the second light information.

For example, before transmitting the message notifying the light setting mode entry to the first lighting device 200-1 in operation 1221, the control device 100 can transmit the message requesting the first RSSI information and the first light information. Before transmitting the message notifying the light setting mode entry to the second lighting device 200-2 in operation 1223, the control device 100 can transmit the message requesting the second RSSI information and the second light information.

Alternatively, after transmitting the message notifying the light setting mode entry to the first lighting device 200-1 in operation 1221, the control device 100 can transmit the message requesting the first RSSI information and the first light information. After transmitting the message notifying the light setting mode entry to the second lighting device 200-2 in operation 1223, the control device 100 can transmit the message requesting the second RSSI information and the second light information.

For example, the time for the control device 100 to transmit the message requesting the first RSSI information and the first light information can differ. Similarly, the time for the control device 100 to transmit the message requesting the second RSSI information and the second light information can differ.

In operation 1233, the first lighting device 200-1 transmits the first RSSI information and the first light information to the control device 100. In operation 1235, the second lighting device 200-2 transmits the second RSSI information and the second light information to the control device 100. For example, the information of the first lighting device 200-1 can include at least one of the model name, the output color, the color temperature, and the watts of the first lighting device 200-1. The information of the second lighting device 200-2 can include at least one of the model name, the output color, the color temperature, and the watts of the second lighting device 200-2.

The control device 100 can display the light setting UI on the screen display unit of the control device 100 based on at least one of the first RSSI information and the second RSSI Information. The light setting UI indicates the UI for controlling the first lighting device 200-1 and the second lighting device 200-2.

For example, the control device 100 can arrange and display icons corresponding to the first lighting device 200-1 and the second lighting device 200-1 on the screen display unit based on at least one of the first RSSI information and the second RSSI information in operation 1237. For example, the control device 100 can determine the distance between the control device 100 and the first lighting device 200-1 based on at least one of the first RSSI information and the second RSSI information. In addition, the control device 100 can determine the distance between the control device 100 and the second lighting device 200-2 based on at least one of the first RSSI information and the second RSSI information. The control device 100 can arrange and display the icons corresponding to the first lighting device 200-1 and the second lighting device 200-1 in an ascending order of the distance from the control device 100.

In operation 1239, the control device 100 can generate first light setting information of the first lighting device 200-1 according to a user's input signal through the light setting UI. The control device 100 can generate second light setting information of the second lighting device 200-2 according to a user's input signal through the light setting UI.

In operation 1241, the control device 100 transmits the first light setting information to the first lighting device 200-1. In operation 1243, the control device 100 transmits the second light setting information to the second lighting device 200-2.

In operation 1245, the first lighting device 200-1 sets the lighting of the first lighting device 200-1 based on the first light setting information. In operation 1247, the second lighting device 200-2 sets the lighting of the second lighting device 200-2 based on the second light setting information.

Referring to FIG. 12C, the control device 100 can transmit and receive signals to and from the second lighting device 200-2 via the first lighting device 200-1. For example, the second lighting device 200-2 can be out of the communication range of the control device 100. The first lighting device 200-1 can be in the communication range of the control device 100 and the second lighting device 200-2.

The control device 100 enters the light setting mode in operation 1219. In operation 1221, the control device 100 transmits a message notifying the light setting mode entry to the first lighting device 200-1. In operation 1223, the first lighting device 200-1 forwards the message received from the control device 100 to the second lighting device 200-2.

The first lighting device 200-1 can receive an arbitrary signal from the control device 100 at a preset cycle. The arbitrary signal indicates the signal for the first lighting device 200-1 to measure the RSSI from the control device 100. For example, the control device 100 can transmit the arbitrary signal to the first lighting device 200-1 at the preset cycles so that the first lighting device 200-1 can measure the RSSI from the control signal 100.

In operations 1225 and 1227, the first lighting device 200-1 and the second lighting device 200-2 each measure the RSSI of the arbitrary signal. The first lighting device 200-1 automatically controls its light brightness based on the RSSI in operation 1229. The first lighting device 200-1 can automatically control its light brightness according to the RSSI and a preset RSSI threshold. The RSSI measured by the first lighting device 200-1 can vary according to movement of the control device 100. That is, the RSSI measured by the first lighting device 200-1 can vary according to the distance change between the control device 100 and the first lighting device 200-1. Hence, the first lighting device 200-1 can control to increase or decrease its light brightness according to a preset criterion based on the movement of the control device 100.

Based on the message notifying the light setting mode entry of the control device 100 received from the first lighting device 200-1, the second lighting device 200-2 automatically controls its light brightness based on the RSSI in operation 1231. Upon receiving the message notifying the light setting mode entry from the first lighting device 200-1, rather than the control device 100, the second lighting device 200-2 can determine that it is out of the communication range of the control device 100. To notify the out-of-communication range of the control device 100, the second lighting device 200-2 can output no light or flicker the light.

The message notifying the light setting mode entry in operation 1221 can include a message requesting first RSSI information generated by the first lighting device 200-1 and first light information of the first lighting device 200-1. The message notifying the light setting mode entry in operation 1223 can include a message requesting second RSSI information generated by the second lighting device 200-2 and second light information of the second lighting device 200-2.

According to yet another embodiment of the present disclosure, the message notifying the light setting mode entry in operation 1221 may not include the message requesting the first RSSI information and the first light information. The message notifying the light setting mode entry in operation 1223 may not include the message requesting the second light information.

For example, before transmitting the message notifying the light setting mode entry to the first lighting device 200-1 in operation 1221, the control device 100 can transmit the message requesting the first RSSI information and the first light information. Before transmitting the message notifying the light setting mode entry to the second lighting device 200-2 in operation 1223, the control device 100 can transmit the message requesting the second RSSI information and the second light information.

Alternatively, after transmitting the message notifying the light setting mode entry to the first lighting device 200-1 in operation 1221, the control device 100 can transmit the message requesting the first RSSI information and the first light information. After transmitting the message notifying the light setting mode entry to the second lighting device 200-2 in operation 1223, the control device 100 can transmit the message requesting the second RSSI information and the second light information.

For example, the time for the control device 100 to transmit the message requesting the first RSSI information and the first light information can vary. Similarly, the time for the control device 100 to transmit the message requesting the second RSSI information and the second light information can vary.

In operation 1233, the first lighting device 200-1 transmits the first RSSI information and the first light information to the control device 100. In operation 1235, the second lighting device 200-2 transmits the second RSSI information and the second light information to the first lighting device 200-1. The first lighting device 200-1 forwards the second RSSI information and the second light information to the control device 100 in operation 1237.

For example, the information of the first lighting device 200-1 can include at least one of the model name, the output color, the color temperature, and the watts of the first lighting device 200-1. The information of the second lighting device 200-2 can include at least one of the model name, the output color, the color temperature, and the watts of the second lighting device 200-2.

In operation 1239, the control device 100 can display a light setting UI on its display/input unit 303 based on at least one of the first RSSI information and the second RSSI Information. The light setting UI indicates the UI for controlling the first lighting device 200-1 and the second lighting device 200-2.

For example, the control device 100 can arrange and display icons corresponding to the first lighting device 200-1 and the second lighting device 200-2 on the display/input unit 303 based on at least one of the first RSSI information and the second RSSI information. For example, the control device 100 can determine the distance between the control device 100 and the first lighting device 200-1 based on at least one of the first RSSI information and the second RSSI information. In addition, the control device 100 can determine the distance between the control device 100 and the second lighting device 200-2 based on at least one of the first RSSI information and the second RSSI information. The control device 100 can arrange and display the icons corresponding to the first lighting device 200-1 and the second lighting device 200-2 in an ascending order of the distance from the control device 100.

In operation 1241, the control device 100 can generate first light setting information of the first lighting device 200-1 according to a user's input signal through the light setting UI. The control device 100 can generate second light setting information of the second lighting device 200-2 according to a user's input signal through the light setting UI.

In operation 1243, the control device 100 transmits the first light setting information and the second light setting information to the first lighting device 200-1. In operation 1245, the first lighting device 200-1 forwards the second light setting information to the second lighting device 200-2.

In operation 1247, the first lighting device 200-1 sets its lighting based on the first light setting information. In operation 1249, the second lighting device 200-2 sets its lighting based on the second light setting information.

Referring to FIGS. 12B and 12C, the two lighting devices 200-1 and 200-2 are depicted to ease the understanding. According to various embodiments of the present disclosure, the number of the lighting devices can exceed three.

The control device 100 can determine a condition for light group setting. The control device 100 can receive the light group setting condition from the user through the UI. For example, the control device 100 can display condition items of the light group setting through the UI on the display/input unit 303. The condition items of the light group setting can include at least one of proximity, the model name, the output color, the color temperature, and the watts.

In operation 1211, the control device 100 generates a group recommendation. The control device 100 can confirm that the user selects at least one of the light group setting condition items through the UI.

For example, when the user selects the proximity item, the control device 100 can generate the group recommendation based on the proximity of the at least one lighting device. For example, the control device 100 can determine the proximity based on the RSSI received from the at least one lighting device or the RSSI information received from the at least one lighting device. When the user selects the model name item, the control device 100 can generate the group recommendation based on the model name of the at least one lighting device. For example, the control device 100 can group at least one lighting device of the same model name based on the model name of the at least one lighting device.

For example, the control device 100 can organize groups as shown in Table 7.

TABLE 7

|  | lighting device included in group | model name of lighting device |
|---|---|---|
| group 1 | lighting device 1 | ABC |
|  | lighting device 2 | ABC |
| group 2 | lighting device 3 | XYZ |
|  | lighting device 4 | XYZ |

For example, a model name of the first lighting device 200-1 and a model name of the second lighting device 200-2 can be 'ABC'. A model name of the third lighting device 200-3 and a model name of the fourth lighting device 200-4 can be 'XYZ'. The control device 100 can divide the first lighting device 200-1 and the second lighting device 200-2 into a first group. The control device 100 can divide the third lighting device 200-3 and the fourth lighting device 200-4 into a second group.

When the user selects the output light color item, the control device 100 can generate the group recommendation based on the output light color of the at least one lighting device. For example, the control device 100 can group at least one lighting device of the same color light based on the output color light of the at least one lighting device.

For example, the control device 100 can organize groups as shown in Table 8.

TABLE 8

|  | lighting device included in group | outputable color |
|---|---|---|
| group 1 | lighting device 1 | red |
|  | lighting device 2 | red |
| group 2 | lighting device 3 | blue |
|  | lighting device 4 | blue |

For example, an output color of the first lighting device 200-1 and an output color of the second lighting device 200-2 can be red. An output color of the third lighting device 200-3 and an output color of the fourth lighting device 200-4 can be blue. The control device 100 can divide the first lighting device 200-1 and the second lighting device 200-2 into a first group. The control device 100 can divide the third lighting device 200-3 and the fourth lighting device 200-4 into a second group.

When the user selects the color temperature item, the control device 100 can generate the group recommendation based on the color temperature of the at least one lighting device. For example, the control device 100 can group at least one lighting device of the same color temperature based on the color temperature of the at least one lighting device. A unit of the color temperature can be the kelvin (K). The control device 100 can determine a range of the color temperature so as to classify the at least one lighting device based on the color temperature. For example, the control device 100 can classify the color temperature range based on 1000 K. For example, the control device 100 can divide the color temperature range into 0 K through 999 K, 1000 K through 1999 K, 2000 K through 2999 K, and so on. The range can be divided variously.

For example, the control device 100 can organize groups as shown in Table 9.

TABLE 9

|  | lighting device included in group | color temperature |
|---|---|---|
| group 1 | lighting device 1 | 3000K |
|  | lighting device 2 | 3500K |
| group 2 | lighting device 3 | 7000K |
|  | lighting device 4 | 7500K |

For example, a color temperature of the first lighting device 200-1 can be 3000 K and a color temperature of the second lighting device 200-2 can be 3500 K. A color temperature of the third lighting device 200-3 can be 7000 K and a color temperature of the fourth lighting device 200-4 can be 7500 K. The control device 100 can divide the first lighting device 200-1 and the second lighting device 200-2 belonging to the range from 3000 K to 3999 K, into a first group. The control device 100 can divide the third lighting device 200-3 and the fourth lighting device 200-4 belonging to the range from 7000 K to 7999 K, into a second group.

When the user selects the watts item, the control device 100 can generate the group recommendation based on the watts of the at least one lighting device. For example, the control device 100 can group at least one lighting device of the same watts based on the watts of the at least one lighting device.

A unit of watts can be the watt (W). The control device 100 can determine a range of the watts so as to classify the at least one lighting device based on the watts. For example, the control device 100 can classify the watts range based on 10 W. For example, the control device 100 can divide the watts range into 0 W through 9 W, 10 W through 19 W, 20 W through 29 W, and so on. The range can be divided variously.

For example, the control device 100 can organize groups as shown in Table 10.

TABLE 10

|  | lighting device included in group | watt (degree: w) |
|---|---|---|
| group 1 | lighting device 1 | 25 w |
|  | lighting device 2 | 30 w |
| group 2 | lighting device 3 | 35 w |
|  | lighting device 4 | 40 w |

For example, the watts of the first lighting device 200-1 can be 25 W and the watts of the second lighting device 200-2 can be 30 W. The watts of the third lighting device 200-3 can be 35 W and the watts of the fourth lighting device 200-4 can be 40 W. The control device 100 can divide the first lighting device 200-1 and the second lighting device 200-2 belonging to the range from 20 W to 29 W, into a first group. The control device 100 can divide the third lighting device 200-3 and the fourth lighting device 200-4 belonging to the range from 30 W to 39 W, into a second group.

Figure 13:
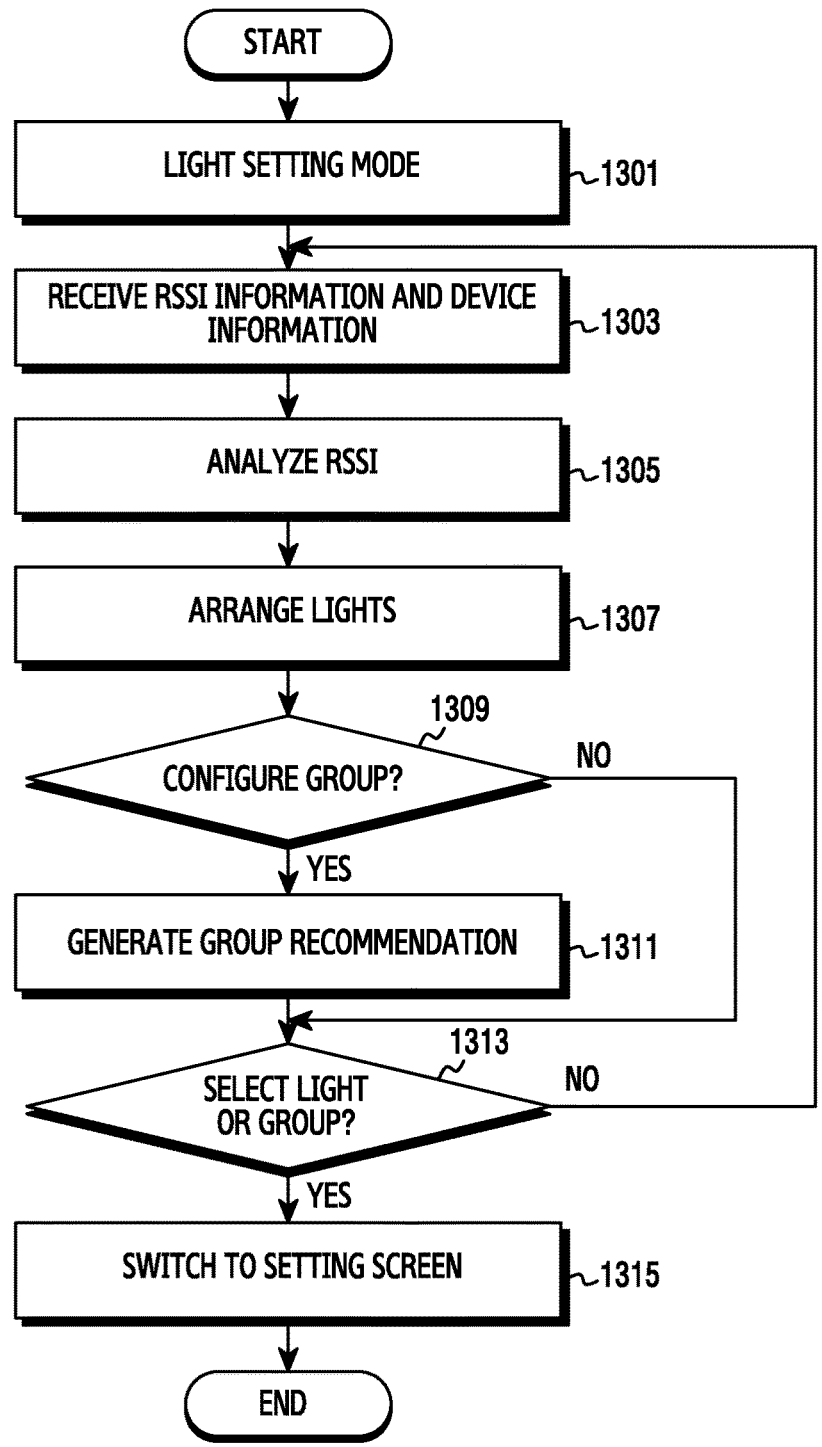
FIG. 13 is a flowchart of a control device according to an embodiment of the present disclosure.

FIG. 13 is a flowchart of a control device according to an embodiment of the present disclosure.

Referring to FIG. 13, the control device 100 enters a light setting mode in operation 1301. The control device 100 can transmit a message notifying the light setting mode entry to at least one lighting device.

In operation 1303, the control device 100 receives RSSI information and device information of the at least one lighting device. The control device 100 can transmit to the at least one lighting device a message requesting the RSSI information and the lighting device information. The lighting device information can include at least one of the model name, the light output color, the color temperature, and the watts of the lighting device. The RSSI information can include the RSSI of the at least one lighting device. For example, the RSSI information can include RSSI information received at the at least one lighting device from at least one other lighting device. The control device 100 can receive the RSSI information and the lighting device information from at least one lighting device. According to an embodiment of the present disclosure, the control device 100 can measure the RSSI of at least one lighting device.

In operation 1305, the control device 100 analyzes the RSSI information received from the at least one lighting device. The control device 100 can analyze the received RSSI information and obtain the distance between the at least one lighting device and the control device 100. According to an embodiment of the present disclosure, the control device 100 can obtain the distance between the at least one lighting device and the control device 100 according to the RSSI measurement of the at least one lighting device.

In operation 1307, the control device 100 arranges the at least one lighting device. The control device 100 can control to arrange and display the at least one lighting device based on the determined distance in the display of the control device 100. For example, the control device 100 can arrange and display the at least one lighting device in the ascending order of the distance from the control device 100 in the UI of the display. For example, the control device 100 can control to arrange the at least one lighting device and to display a list including at least one of the icon indicating the at least one lighting device type and the at least one lighting device name in the display.

According to an embodiment of the present disclosure, the control device 100 can control to arrange and display the at least one lighting device in the display according to at least one of the model name, the light output color, the color temperature, and the watts of the at least one lighting device.

In operation 1309, the control device 100 determines whether to generate the group recommendation for the at least one lighting device. The control device 100 can control to display the UI for determining whether to recommend the group of the at least one lighting device in the display of the control device 100. The control device 100 can generate the group recommendation about the at least one lighting device according to the group recommendation determination through the UI. When the user inputs the group recommendation command through the UI, the control device 100 can generate the group recommendation about the at least one lighting device in operation 1311. When the user inputs no group recommendation command through the UI, the control device 100 determines whether the individual light is selected in operation 1013.

Upon receiving the group recommendation command from the user, the control device 100 generates the group recommendation in operation 1311. The control device 100 can generate the group recommendation according to at least one of the RSSI information and the device information received from the at least one lighting device. For example, when generating the group recommendation with the RSSI information, the control device 100 can recommend the lighting devices at the short distance as one group according to the distance of the at least one lighting device.

In operation 1313, the control device 100 can determine whether the group or the light is selected. The control device 100 can receive a light group or individual light selection command from the user through the UI. When the user does not select the group or the light through the UI, the control device 100 receives RSSI information and device information of at least one lighting device in operation 1303. The control device 100 can receive RSSI information and device information of at least one other lighting device so as to configure the at least one other lighting device.

When the user selects the group or the light through the UI, the control device 100 switches to a setting screen for setting the group or the light in operation 1315. The control device 100 can control to display a UI for setting the light group or the individual lights in the display of the control device 100. When the setting of the at least one lighting device is finished, the control device 100 can transmit a message notifying the light setting end to the at least one lighting device.

Figure 14:
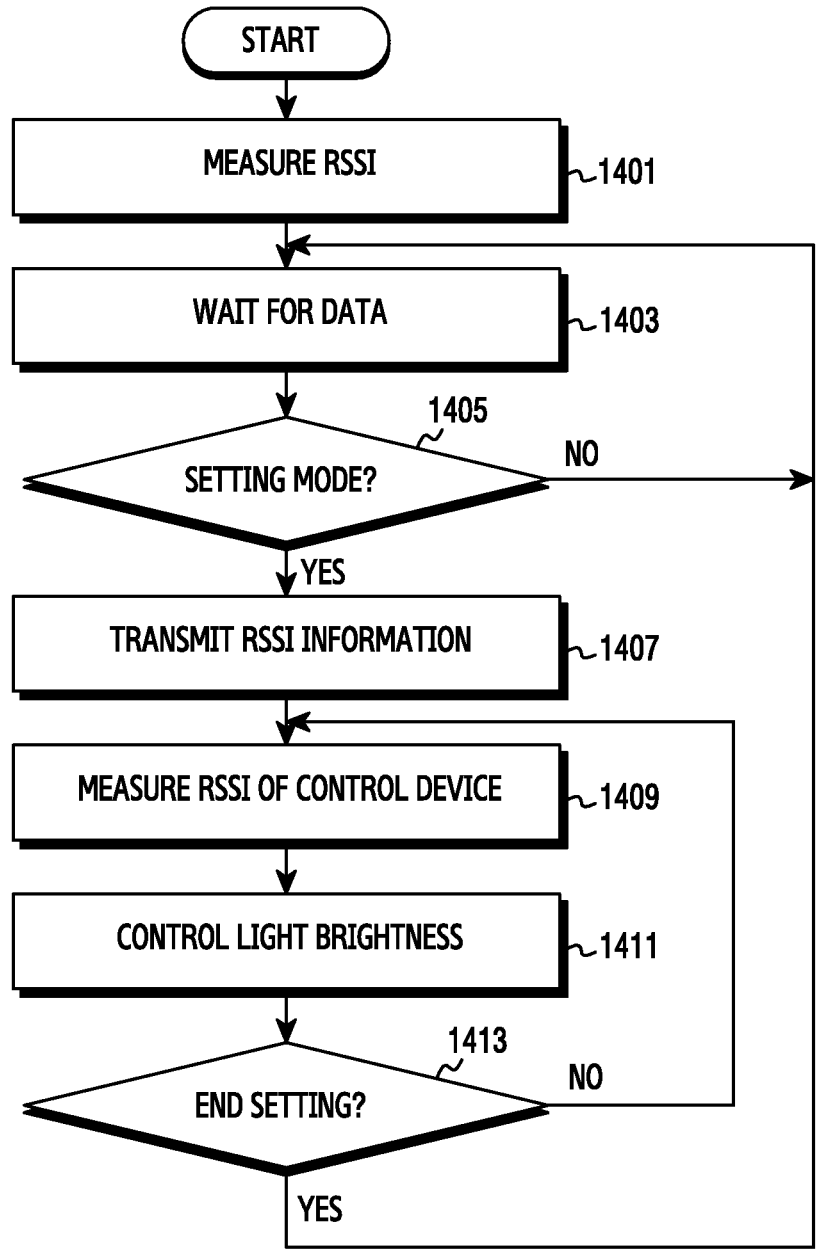
FIG. 14 is a flowchart of a lighting device according to an embodiment of the present disclosure.

FIG. 14 is a flowchart of a lighting device according to an embodiment of the present disclosure.

Referring to FIG. 14, the lighting device 200 measures the RSSI in operation 1401. The lighting device 200 can measure the RSSI of at least one other lighting device. The lighting device 200 can generate RSSI information including the RSSI measurement information of the at least one lighting device.

In operation 1403, the lighting device 200 waits to receive data. The lighting device 200 can wait to receive data from the control device 100.

In operation 1405, the lighting device 200 determines whether the data received from the control device 100 is a message notifying the light setting mode. When the received data is the message notifying the light setting mode, the lighting device 200 can transmit the RSSI information generated in operation 1401 to the control device 100 in operation 1407. When the received data is not the message notifying the light setting mode, the lighting device 200 waits for data in operation 1403.

In operation 1407, the lighting device 200 transmits the RSSI information to the control device 100. The lighting device 200 can transmit the RSSI information including RSSI measurement information of at least one other lighting device to the control device 100. According to an embodiment of the present disclosure, the lighting device 200 can receive a message requesting the device information of the lighting device 200, from the control device 100. The lighting device 200 can receive from the control device 100 the message requesting the device information including at least one of the model name, the output color, the color temperature, and the watts of the lighting device 200.

In operation 1409, the lighting device 200 measures the RSSI of the control device 100. The lighting device 200 can measure the RSSI of the control device 100 so as to control the light brightness according to the RSSI of the control device 100.

In operation 1411, the lighting device 200 controls the light brightness. The lighting device 200 can control the light brightness of the lighting device 200 according to the RSSI of the control device 100. For example, when the RSSI of the control device 100 exceeds a threshold, the lighting device 200 can control to increase or decrease the light brightness of the lighting device 200. When the RSSI of the control device 100 falls below the threshold, the lighting device 200 can control to increase or decrease the light brightness of the lighting device 200. It is possible to preset to control to increase or decrease the light brightness of the lighting device 200.

In operation 1413, the lighting device 200 determines whether the setting of the lighting device 200 is finished. The lighting device 200 can be controlled by a control signal of the control device 100. For example, the lighting device 200 can control the brightness and a light output time of the lighting device 200 according to a control message of the control message 100.

Upon receiving a message notifying the control end of the lighting device 200 from the control device 100, the lighting device 200 waits for data in operation 1403. When not receiving the message notifying the control end of the lighting device 200 from the control device 100, the lighting device 200 measures the RSSI of the control device 100 in operation 1409.

The control device 100 can control the brightness of the at least one lighting device. The control device 100 can control the brightness of the at least one lighting device according to the position of the at least one lighting device. For example, when four lighting devices are placed in a lighting device recognition range, the control device 100 can control to increase the brightness of the lighting device away from the control device 100 according to the distances between the four lighting devices and the control device 100. For example, the control device 100 can control to decrease the brightness of the lighting device close to the control device 100 and to increase the brightness of the lighting device away from the control device 100. According to an embodiment of the present disclosure, the control device 100 can control to light up the light close to the control device and to dim the light away from the control device 100.

Figure 15:
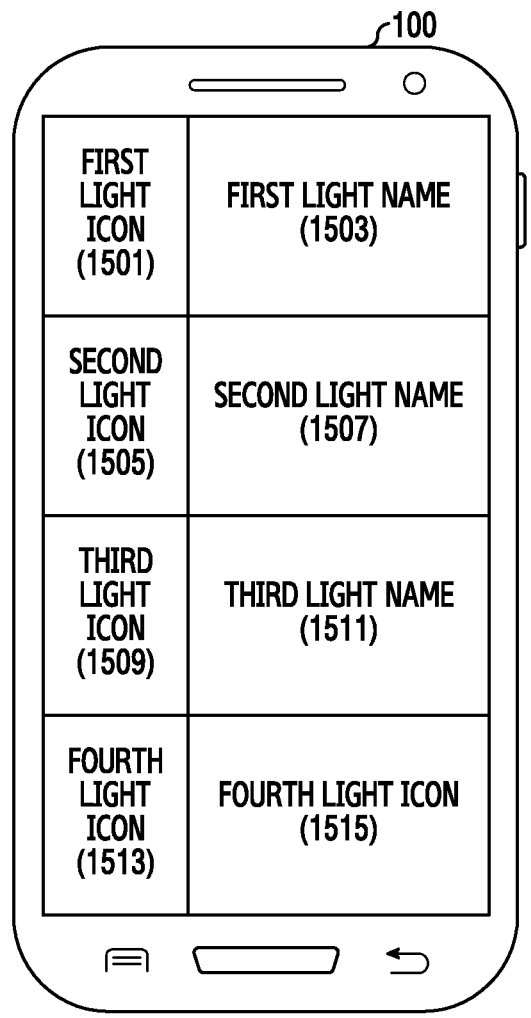
FIG. 15 illustrates a user interface (UI) for setting a lighting device in a control device according to an embodiment of the present disclosure.

FIG. 15 illustrates a UI for setting a lighting device in a control device according to an embodiment of the present disclosure.

Referring to FIG. 15, the control device 100 can provide the user with a UI for controlling and grouping at least one lighting device 200. For example, the control device 100 can receive signals for recognizing the first lighting device 200-1 through the fourth lighting device 200-4, from the first lighting device 200-1 through the fourth lighting device 200-4. The control device 100 can provide the UI including the recognition result of the first lighting device 200-1 through the fourth lighting device 200-4. For example, the UI can include icons 1501, 1505, 1509, and 1513 indicating a type of the first lighting device 200-1 through the fourth lighting device 200-4, and names 1503, 1507, 1511, and 1515 of the first lighting device 200-1 through the fourth lighting device 200-4. The names 1503, 1507, 1511, and 1515 of the first lighting device 200-1 through the fourth lighting device 200-4 can be displayed as model names or IDs.

The control device 100 can arrange and display the lighting devices 200-1 through 200-4 in an ascending order of the distance from the control device 100. The control device 100 can measure the RSSI values of the lighting devices 200-1 through 200-4 and determine the distances between the lighting devices 200-1 through 200-4 and the control device 100 according to the RSSI values. For example, when the first lighting device 200-1, the second lighting device 200-2, the third lighting device 200-3, and the fourth lighting device 200-4 are close to the control device 100 in the named order, the control device 100 can display the first light icon 1501 and the first light name 1503 corresponding to the first lighting device 200-1 at the top of the display, the second light icon 1505 and the second light name 1507 corresponding to the second lighting device 200-2 at the second top position, the third light icon 1509 and the third light name 1511 corresponding to the third lighting device 200-3 at the third position, and the fourth light icon 1513 and the fourth light name 1515 corresponding to the fourth lighting device 200-4 at the fourth position, in the ascending order of the distance from the control device 100.

In doing so, the lighting devices 200-1 through 200-4 can control and output their brightness so that the user of the control device 100 can intuitively recognize the approximate distances of the lighting devices 200-1 through 200-4 from the user. For example, the lighting devices 200-1 through 200-4 can control and output the light brightness according to their measured RSSI value of the control device 100. For example, when the RSSI value of the control device 100 measured by at least one of the lighting devices 200-1 through 200-4 exceeds a threshold, the at least one lighting device can dim the light of the at least one lighting device. By contrast, when the RSSI value of the control device 100 measured by the at least one lighting device falls below threshold, the at least one lighting device can increase the light brightness of the at least one lighting device. For example, the lighting devices 200-1 through 200-4 can dim the light as the distance to the control device 100 gets shorter, and light up as the distance to the control device 100 gets longer. According to an embodiment of the present disclosure, the lighting devices 200-1 through 200-4 can light up as the distance to the control device 100 gets shorter, and dim as the distance to the control device 100 gets longer.

The order of arranging the light icons and names 1501 through 215 displayed in the control device 100 can change according to the RSSI values of the lighting devices 200-1 through 200-4 measured by the control device 100 varying based on the movement of the user carrying the control device 100. The brightness of the lighting devices 200-1 through 200-4 can change according to the RSSI value of the signal of the control device 100 measured by the lighting devices 200-1 through 200-4 varying based on the movement of the user carrying the control device 100.

According to an embodiment of the present disclosure, the number of the lighting devices recognized by the control device 100 can fall below or exceed four. The position, configuration, and number of the light icons 1501, 1505, 1509, and 1513 and the light names 1503, 1507, 1511, and 1515 of the lighting device setting UI can vary.

Figure 16:
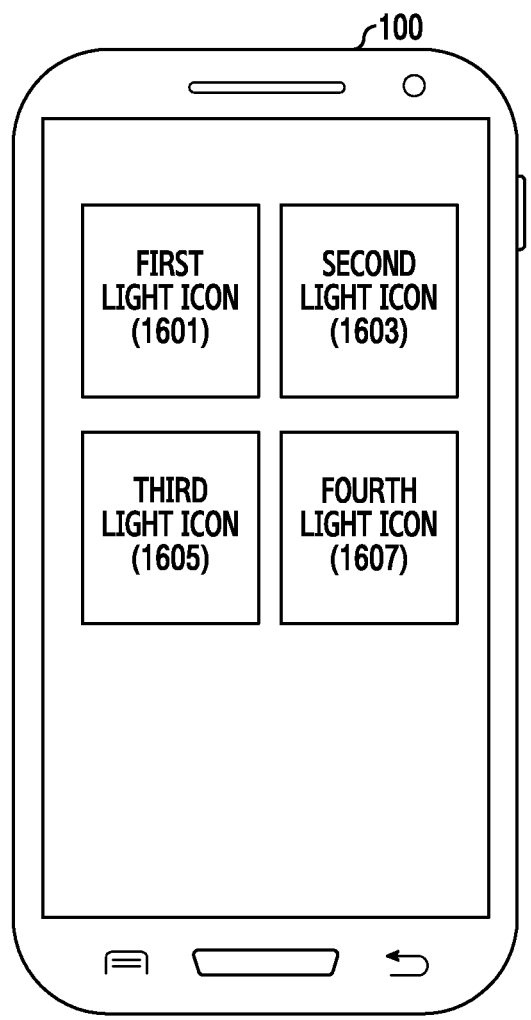
FIG. 16 illustrates a lighting device setting UI in a control device according to an embodiment of the present disclosure.

FIG. 16 illustrates a lighting device setting UI in a control device according to an embodiment of the present disclosure.

Referring to FIGS. 3 and 16, the control device 100 can display a result of recognizing a plurality of lighting devices using icons or items. For example, when recognizing four lighting devices 200-1 through 200-4, the control device 100 can display a result of recognizing the four lighting devices 200-1 through 200-4 by taking into account distances between the lighting devices 200-1 through 200-4 and the control device 100. For example, when the first lighting device 200-1, the second lighting device 200-2, the third lighting device 200-3, and the fourth lighting device 200-4 are away from the control device 100 in the order named, the control device 100 can display a first light icon 1601 through a fourth light icon 1607 corresponding to the recognition result of the first lighting device 200-1 through the fourth lighting device 200-4 in the ascending order of the distance. The light icons 1607 through 1607 can be arranged and displayed in the ascending order of the distance from top to bottom, from left to right, or in a combination of the two manners.

According to an embodiment of the present disclosure, the light icons 1601 through 1607 can be displayed in the order of recognizing the plurality of lighting devices in the control device. According to an embodiment of the present disclosure, the result of recognizing the plurality of lightings can be displayed variously.

Figure 17:
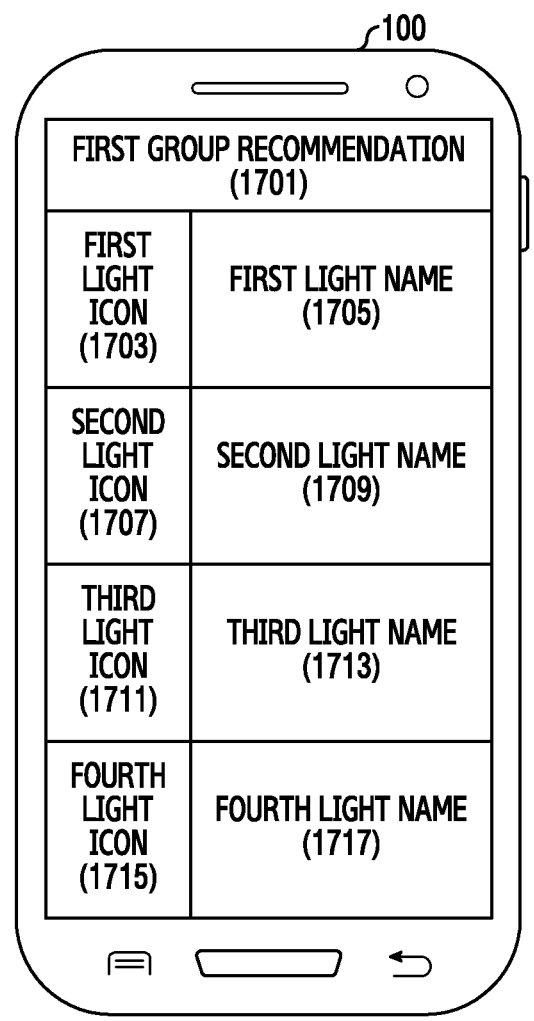
FIG. 17 illustrates a lighting device group recommendation UI of a control device according to an embodiment of the present disclosure.

FIG. 17 illustrates a lighting device group recommendation UI of a control device according to an embodiment of the present disclosure.

Referring to FIG. 17, the control device 100 can generate a light group recommendation. For example, the control device 100 can group the first lighting device 200-1 through the fourth lighting device 200-4 according to RSSI information and light information received from the first lighting device 200-1 through the fourth lighting device 200-4. For example, when grouping the first lighting device 200-1 through the fourth lighting device 200-4 based on the distance of the RSSI information, the control device 100 can generate a recommendation for grouping the first lighting device 200-1, the second lighting device 200-2, and the third lighting device 200-3 into one group. For example, in the UI, the control device 100 can display a first group recommendation 1701, a first light icon 1703, a second light icon 1707, and a third light icon 1711 indicating the first lighting device 200-1, the second lighting device 200-2, and the third lighting device 200-3 belonging to the first group recommendation 1701, and a first light name 1705, a second light name 1709, and a third light name 1713 so as to distinguish them from a fourth light icon 1715 and a fourth light name 1717 not belonging to the group. For example, the control device 100 can display the first light icon 1703, the second light icon 1707, the third light icon 1711, the first light name 1705, the second light name 1709, and the third light name 1713 of the first group recommendation 1701 in a different color from the fourth light icon 1715 and the fourth light name 1717.

According to an embodiment of the present disclosure, the position, configuration, and number of the first light icon 1703 through the fourth light icon 1715 and the first light name 1705 through the fourth light name 1717 of the lighting device group recommendation UI can vary.

Figure 18:
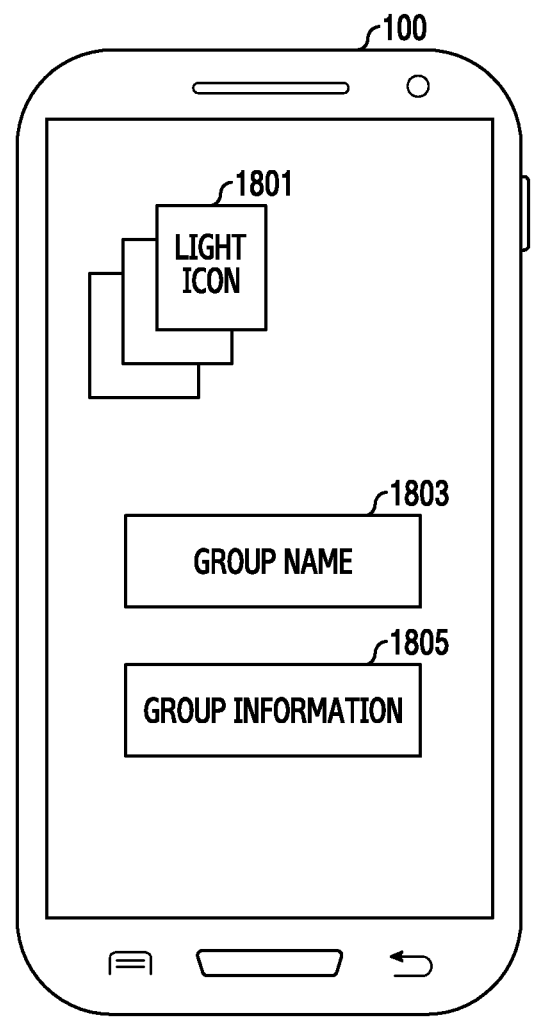
FIG. 18 illustrates a lighting device group setting UI of a control device according to an embodiment of the present disclosure.

FIG. 18 illustrates a lighting device group setting UI of a control device according to an embodiment of the present disclosure.

Referring to FIG. 18, when the user selects a lighting device group recommended by the control device 100 or selects and groups at least one lighting, the control device 100 can provide a lighting device group setting UI. The lighting device group setting UI can include icons 1801 indicating a type of the grouped lightings, a name 1803 of the light group, and information 1805 about the light group. For example, the light group name 1803 can be 'living room', and the group information 1805 can be 'a first light, a second light, and a third light at the center of the living room'.

According to an embodiment of the present disclosure, the position and configuration of the light icons 1801, the group name 1803, and the group information 1805 of the lighting device group setting UI can vary.

Figure 19:
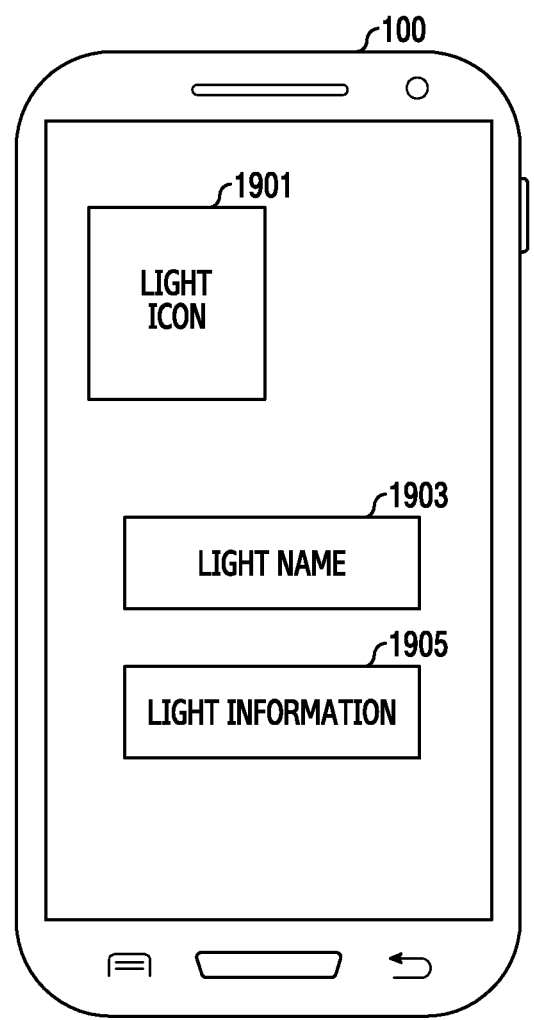
FIG. 19 illustrates a lighting device setting UI of a control device according to an embodiment of the present disclosure.

FIG. 19 illustrates a lighting device setting UI of a control device according to an embodiment of the present disclosure.

Referring to FIG. 19, the control device 100 can provide the user with a UI for setting the lights in addition to the light group setting. For example, the lighting device setting UI can include an icon 1901 indicating a type of the light, a light name 1903, and light information 1905. For example, the light name 1903 can include 'bedroom light 1' and the light information 1905 can include 'the light on the left of the bed'. The icon 1901 can vary according to the type of the light.

According to an embodiment of the present disclosure, the position and configuration of the light icon 1901, the group name 1903, and the group information 1905 of the lighting device setting UI can vary.

Figure 20A:
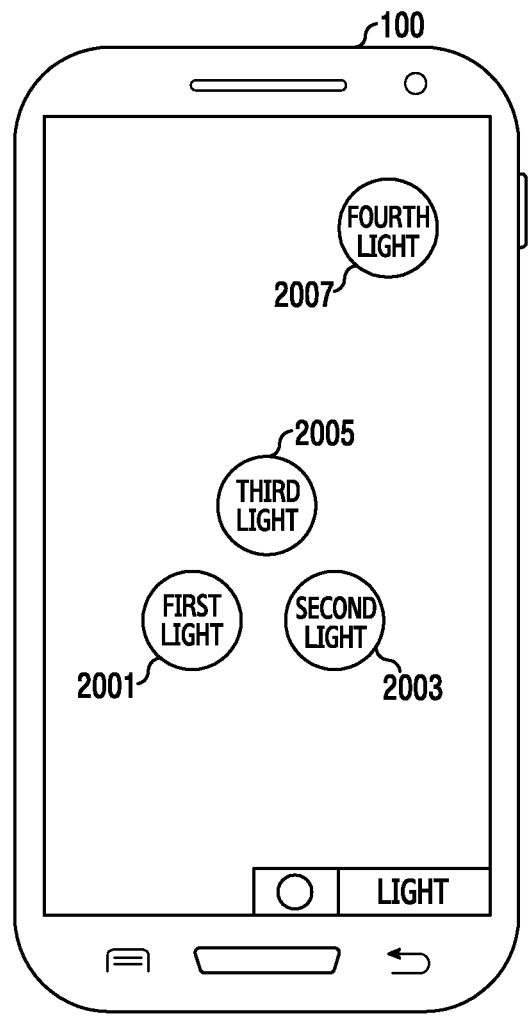
FIGS. 20A and 20B illustrate a light arrangement information UI of a control device according to an embodiment of the present disclosure.
Figure 20B:
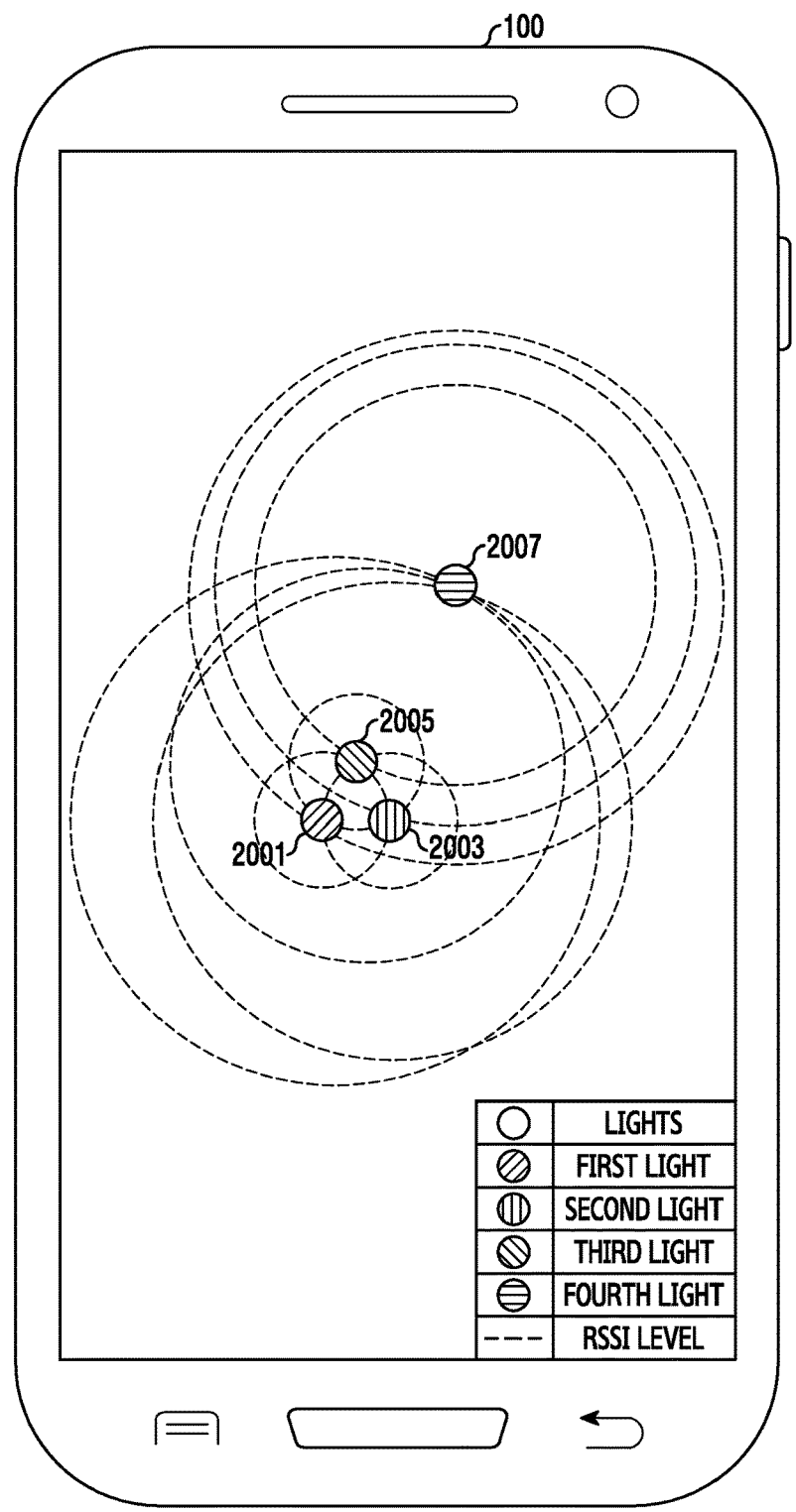

FIGS. 20A and 20B illustrate a light arrangement information UI of a control device according to an embodiment of the present disclosure.

Referring to FIG. 20A, the control device 100 can display marks 2001 through 2007 indicating positions of a first lighting device through a fourth lighting device on a floor plan. The control device 100 can display the marks 2001 through 2007 indicating the positions of the lighting devices on the floor plan so that the user can recognize the potions of the lighting devices. According to an embodiment of the present disclosure, when at least one of the marks 2001 through 2007 indicating the positions of the lighting devices is selected, the control device 100 can display the lighting device setting UI for controlling the lighting device corresponding to the selected mark.

Referring to FIG. 20B, the control device 100 can display the RSSI of signals received from the lighting devices on the floor plan. For example, the control device 100 can measure the RSSI of the signals received from the lighting devices and display an RSSI level of the lighting devices using a dotted line on the floor plan. The control device 100 can display the RSSI level of the lighting devices using the dotted lines on the floor plan according to the RSSI information received from the lighting devices. A smaller radius of the dotted line surrounding the lighting devices can indicate a higher RSSI of the lighting devices.

According to an embodiment of the present disclosure, the position and number of the marks 2001 through 2007 indicating the positions of the lighting devices can vary.

Figure 21:
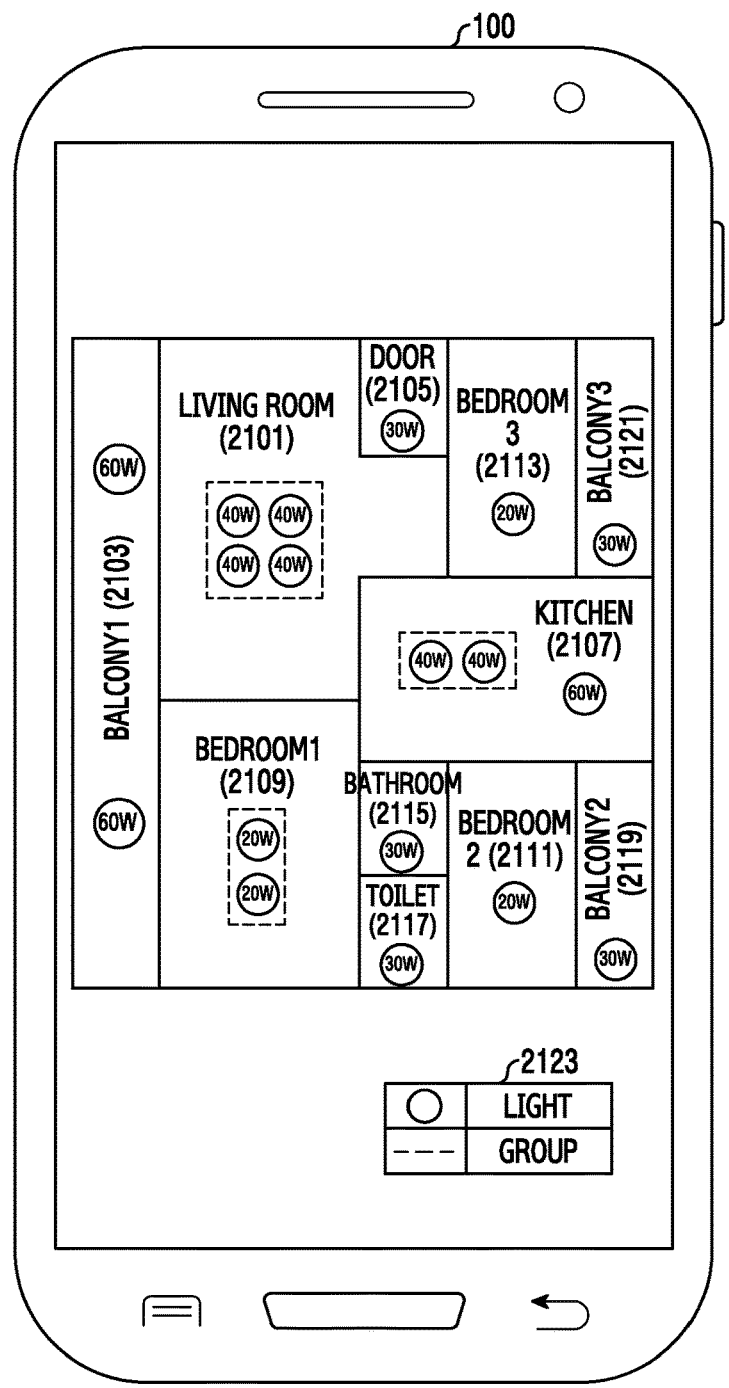
FIG. 21 illustrates a light arrangement information UI of a control device according to an embodiment of the present disclosure.

FIG. 21 illustrates a light arrangement information UI of a control device according to an embodiment of the present disclosure.

Referring to FIG. 21, the control device 100 can display a floor plan marking a position of at least one lighting device recognized by the control device 100. Configuration of the floor plan can be preset by the user. For example, the user can configure the floor plan relating to a space of the user using a light arrangement information UI of the control device 100, and store the floor plan in the control device 100. For example, the user can organize the space of the floor plan through the light arrangement information UI of the control device 100, and set positions of the lighting devices. The control device 100 can receive device information of the lighting devices from the lighting devices. The device information can include at least one of the model name, the output color, the color temperature, and the watts of the lighting device. For example, according to the device information received from the lighting devices, the control device 100 can display the lighting device information corresponding to the positions of the lighting devices at the positions of the lighting devices on the floor plan. For example, the position marks of the lighting devices can display the watts of the corresponding lighting devices. For example, the control device 100 can display positions of four 40 W lights in a living room 2101, two 60 W lights in a first balcony 2103, a 30 W light at a door 2105, two 40 W lights and a 60 W light in a kitchen 2107, two 20 W lights in a first bedroom 2109, a 20 W light in a second bedroom 2111, a 20 W light in a third bedroom 2113, a 30 W light in a bathroom 2115, a 30 W in a toilet 2117, a 30 W light in a second balcony 2119, and a 30 W light in a third balcony 2121. The control device can create a group according to at least one of the model, the color, the color temperature, the watts, and the distance of the at least one lighting device and display the grouped light using the dotted line. For example, the control device can group the four 40 W lights of the living room 2101 into one group, the two 40 W lights of the kitchen 2107 into one group, and the two 20 W light of the first bedroom 2109 into one group, and display them using the dotted line. The control device can display information about the icons displayed in the floor plan using legends 2123.

According to an embodiment of the present disclosure, the marks indicating the positions of the lights can be displayed in the same color according at least one of the model, the color, the color temperature, the watts, and the grouping of the lighting devices. For example, the control device 100 can display the 20 W lights in red, the 30 W lights in yellow, the 40 W lights in green, and the 60 W lights in blue. For example, the control device 100 can display the marks indicating the positions of the lights of the same group in the same color on the floor plan. For example, the control device 100 can display the grouped four 40 W lights of the living room 2101 in orange, the grouped two 20 W lights of the first bedroom 2109 in dark blue, and the grouped two 40 W lights of the kitchen 2107 in gray.

According to an embodiment of the present disclosure, when at least one of the marks indicating the positions of the lighting devices and the group marks is selected, the control device 100 can display a lighting device setting UI for controlling the lighting device or the light group corresponding to the selected mark. For example, when the user touches the 30 W light icon at the door 2105 on a display of the control device 100, the control device 100 can display a UI for setting the 30 W light of the door 2105. For example, when the user touches the dotted line grouping the four 40 W lights of the living room 2101 on the display of the control device 100, the control device 100 can display a UI for setting the four 40 W lights of the living room 2101. Using the UI, the user can set the lights or the light group.

According to an embodiment of the present disclosure, the construction of the floor plan, the position of the lighting device, the number of the lighting devices, and the group of the lighting devices can vary.

Figure 22:
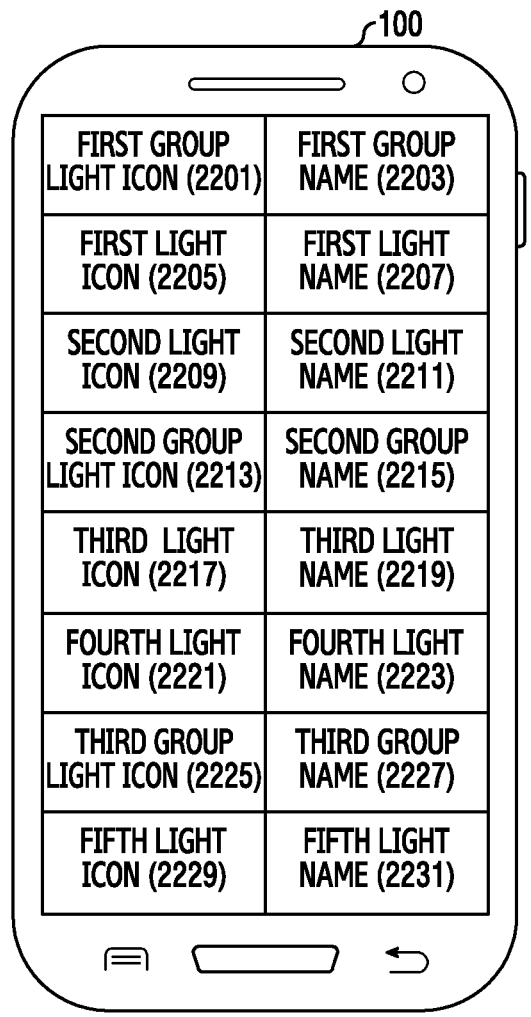
FIG. 22 illustrates a lighting device group setting UI of a control device according to an embodiment of the present disclosure.

FIG. 22 illustrates a lighting device group setting UI of a control device according to an embodiment of the present disclosure.

Referring to FIG. 22, the control device 100 can display a plurality of light groups. For example, the control device 100 can recognize a first lighting device through a fifth lighting device, classify them to a first group, a second group, and a third group based on a characteristic or a position of the lighting device, and then display marks 2201 through 2231 relating to the groups and the lighting devices according to the classified groups. For example, the control device 100 can display the marks 2201 through 2231 by classifying the first lighting device and the second lighting device to the first group, the third lighting device and the fourth lighting device to the second group, and the fifth lighting device to the third group.

The marks 2201 through 2231 can include the first group light icon 2201, the second group light icon 2213, the third group light icon 2225, the first group name 2203, the second group name 2215, the third group name 2227, the first light icon 2205 through the fifth light icon 2229, and the first light name 2207 through the fifth light name 2231. The first group light icon 2201, the second group light icon 2213, and the third group light icon 2225 can indicate the number and the shape of the lights in the group. The first group name 2203, the second group name 2215, and the third group name 2227 can indicate a living room, a kitchen, a bedroom, a porch, an office, and a lobby according to the position of the group. The first light name 2207 through the fifth light name 2231 can be expressed as names indicative of the lighting devices, such as a name, an ID, and a model name of the lighting device.

While the three light groups of the five lighting devices are depicted in FIG. 22, the number of the lighting devices and the number of the light groups can vary. The configuration of the lighting device group setting UI can vary.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one transceiver configured to receive, from a plurality of lighting devices, device information comprising model information of the plurality of lighting devices;
   a display; and
   at least one processor configured to:
      control the display to display a plurality of condition items for lighting device group setting,
      in response to a user input selecting at least one condition item from the plurality of condition items, identify at least two lighting devices based on the selected at least one condition item, among the plurality of lighting devices,
      determine a group comprising the at least two lighting devices, and
      control the display to display positions of the plurality of lighting devices with the determined group on a floor plan,
   wherein the plurality of condition items comprises at least one of a proximity, a model name, an output color, color temperature, or watts.

2. The electronic device of claim 1,
   wherein the display is further configured to display a user interface (UI) for controlling the group,
   wherein the at least one processor is further configured to generate a message for controlling a brightness or a light output time of each of the at least two lighting devices included in the group based on an input on the displayed UI, and
   wherein the at least one transceiver is further configured to transmit the message, to the at least two lighting devices.

3. The electronic device of claim 1,
   wherein the display is further configured to display the determined group by using a dotted line on the floor plan, and
   wherein the dotted line forms at least one circle comprising the at least two lighting devices.

4. The electronic device of claim 1, wherein the at least one processor is further configured to:
   measure received signal strength indicators (RSSIs) of the lighting information received from the plurality of lighting devices, and
   determine the positions of the plurality of lighting devices in a wireless environment, based on the measured RSSIs.

5. The electronic device of claim 4,
   wherein the plurality of lighting devices comprises a first lighting device,
   wherein the device information transmitted from the first lighting device comprises a received signal strength indicator (RSSI) information transmitted from a second lighting device and received by the first lighting device,
   wherein the RSSI information comprises an RSSI measured by the first lighting device, and
   wherein the second lighting device is out of a communication range of the electronic device.

6. The electronic device of claim 1, wherein the at least one processor is further configured to identify the at least two lighting devices corresponding to a same model name in response to the user input selecting the model name.

* * * * *